(12) United States Patent
Attar et al.

(10) Patent No.: US 12,473,216 B2
(45) Date of Patent: Nov. 18, 2025

(54) HOUSEHOLD APPLIANCE WITH COAGULANT DOSING SYSTEM

(71) Applicant: WHIRLPOOL CORPORATION, Benton Harbor, MI (US)

(72) Inventors: Mohsin Mahamadshafi Attar, Maharashtra (IN); Jalindar S. Dawange, Maharashtra (IN); Richard L. Hammond, Mattawan, MI (US); Christopher A. Hartnett, St. Joseph, MI (US); Peter N. Howes, Chicago, IL (US); Eric Monville, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/805,079

(22) Filed: Aug. 14, 2024

(65) Prior Publication Data

US 2024/0400423 A1 Dec. 5, 2024

Related U.S. Application Data

(63) Continuation of application No. 18/202,011, filed on May 25, 2023, now Pat. No. 12,065,366, which is a (Continued)

(51) Int. Cl.
*D06F 39/20* (2024.01)
*C02F 1/52* (2023.01)
(Continued)

(52) U.S. Cl.
CPC .............. *C02F 1/5281* (2013.01); *C02F 1/52* (2013.01); *D06F 39/028* (2013.01);
(Continued)

(58) Field of Classification Search
None
See application file for complete search history.

(56) References Cited

U.S. PATENT DOCUMENTS 5,127,417 A 7/1992 Tromblee et al.
8,286,288 B2 10/2012 Mcallister et al.
(Continued)

FOREIGN PATENT DOCUMENTS

CN 2476549 Y 2/2002
CN 1341562 A 3/2002
(Continued)

OTHER PUBLICATIONS

WO 2017121326 A1 Espacenet translation, Flocculation Washing Machine and Control Method, Xu (Year: 2017).*
(Continued)

*Primary Examiner* — Cristi J Tate-Sims
(74) *Attorney, Agent, or Firm* — McGarry Bair PC

(57) ABSTRACT

Laundry treatment appliances for use in a typical household include a tub that has an opening to provide access to the interior and at least partially defines a treating chamber into which fabric items such as clothes, towels, or linens can be placed to undergo a washing operation. A system can be provided for recirculating wash liquid through the tub to reduce water consumption. At least one tank or reservoir and a coagulant dosing system can be included for the chemical treatment of wash water as part of the wash liquid recirculation system. The tank can also serve to separate coagulated solids from the wash water.

20 Claims, 18 Drawing Sheets

Related U.S. Application Data continuation of application No. 16/953,739, filed on Nov. 20, 2020, now Pat. No. 11,691,899.

(60) Provisional application No. 62/952,633, filed on Dec. 23, 2019.

(51) Int. Cl.
*D06F 39/02* (2006.01)
*D06F 39/08* (2006.01)
*C02F 1/00* (2023.01)
*C02F 103/00* (2006.01)

(52) U.S. Cl.
CPC .......... *D06F 39/083* (2013.01); *D06F 39/088* (2013.01); *D06F 39/20* (2024.01); *C02F 2001/007* (2013.01); *C02F 2103/002* (2013.01)

(56) References Cited

U.S. PATENT DOCUMENTS

| | | | |
|---|---|---|---|
| 8,366,930 B2 | 2/2013 | Huda et al. | |
| 9,657,429 B2 | 5/2017 | Son et al. | |
| 9,981,839 B2 | 5/2018 | Van Dillen et al. | |
| 2002/0121484 A1* | 9/2002 | Arai | C02F 1/56 210/205 |
| 2010/0163468 A1 | 7/2010 | Suzuki et al. | |
| 2014/0223667 A1* | 8/2014 | Kim | D06F 58/203 8/137 |
| 2016/0201249 A1 | 7/2016 | Xu et al. | |
| 2017/0137987 A1 | 5/2017 | Xu et al. | |
| 2018/0142405 A1 | 5/2018 | Carpenter et al. | |
| 2018/0155223 A1 | 6/2018 | Li et al. | |
| 2018/0223468 A1 | 8/2018 | Xu et al. | |
| 2018/0242814 A1 | 8/2018 | Welch | |
| 2018/0334770 A1 | 11/2018 | Irabatti et al. | |
| 2019/0063980 A1 | 2/2019 | Kobs | |
| 2019/0291147 A1 | 9/2019 | Crimston | |

FOREIGN PATENT DOCUMENTS

| | | |
|---|---|---|
| CN | 2744745 Y | 12/2005 |
| CN | 202141240 U | 2/2012 |
| CN | 102553307 A1 | 7/2012 |
| CN | 203866917 U | 10/2014 |
| CN | 106968084 A1 | 7/2017 |
| CN | 107398119 A1 | 11/2017 |
| CN | 208454640 U | 2/2019 |
| CN | 109457440 A | 3/2019 |
| EP | 3385439 A1 | 10/2018 |
| FR | 2941872 A1 | 8/2010 |
| JP | H0622897 A | 2/1994 |
| JP | 2001113090 A | 4/2001 |
| WO | 2012084619 A1 | 6/2012 |
| WO | 2013156750 A1 | 10/2013 |
| WO | 2017121326 A1 | 7/2017 |
| WO | 2019011310 A1 | 1/2019 |

OTHER PUBLICATIONS

European Search Report for Counterpart EP20213256.9, Dated May 11, 2021.
WO 2017121326 A1 translation, Flocculation Washing Machine and Control Method, Xu (Year: 2017).
WO 0191879 A1 translation, Washing Machine With Purifier, and Sewage Purifying Method, Arai (Year: 2001).
Chinese Patent Office, Office Action re Corresponding Chinese No. 2020115270649, dated Mar. 15, 2025, 9 pages.

* cited by examiner

HOUSEHOLD APPLIANCE WITH COAGULANT DOSING SYSTEM

CROSS-REFERENCE TO RELATED APPLICATIONS

This application is a continuation of and claims priority to U.S. patent application Ser. No. 18/202,011, filed May 25, 2023, now U.S. Pat. No. 12,065,366, issued Aug. 20, 2024, which is a continuation of and claims priority to U.S. patent application Ser. No. 16/953,739, filed Nov. 20, 2020, now U.S. Pat. No. 11,691,899, issued Jul. 4, 2023, which claims priority to U.S. Provisional Patent Application No. 62/952,633, filed Dec. 23, 2019, all of which are incorporated herein by reference in their entirety.

BACKGROUND

Laundry treatment appliances for use in a typical household appliance include a tub that has an opening to provide access to the interior and at least partially defines a treating chamber or holds a container, such as a drum or basket, which at least partially defines the treating chamber. Fabric items such as clothes, towels, or linens can be placed in the treating chamber where they are subjected to a treating operation, such as a washing refresh, or de-wrinkle cycle of operation, to name a few.

Clean water that is suitable for these cycles of operations is a limited resource in many places; therefore, appliances that can recycle wash water are advantageous. Previous commercial attempts to re-use water have focused on re-using the water from the cycle of operation that is essentially clean, such as water used during a final rinse cycle, where there are almost no soils or chemicals left in the treating chamber and fabric items.

This disclosure takes a different approach from prior commercial attempts at re-use and focuses on clarifying the water by chemical treatments followed by physical processes to separate solid impurities from the water. Such a clarifying process has the technical benefit of being able to re-use water with soils and chemistry, resulting in recycling of most of the water in the cycle of operation as compared to only already essentially clean water. This disclosure further focuses on a system for delivering the chemical treatment to clarify and process wash water. Consequently, a system for recirculating wash liquid through the appliance can be beneficial to the user by reducing overall water consumption.

BRIEF DESCRIPTION

Household appliances, such as clothes washers and dish washers can have a configuration with a coagulant dosing system for treating water for recycling, which can be stored in a dedicated recycling tank or in a traditional water holding part of the appliance, such as the tub. The coagulant dosing system can be a single-use system or a bulk system. The single-use system contains a single charge of coagulant, typically provided by the user for each cycle of operation, and the bulk system contains multiple charges of coagulant. Whichever type of coagulant dosing system is used, the coagulant can be fluidly coupled to the water by a supply device, such as a gravity-fed or pressurized supply device, which can include a pump. To provide an airtight system, which reduces the likelihood of solidification of the coagulant, the supply device can be configured to supply the coagulant directly into the recycling water.

In one possible implementation of the appliance with a coagulant system, the coagulant can be stored in a user-replaceable cartridge, which is fluidly coupled to a water recycling tank by a dosing pump. The output from the dosing pump is immersed within the recycling water to provide part of an airtight system. The cartridge is also airtight to provide another part of the airtight system. The cartridge can have a pressure equalizer or a variable volume housing to prevent a low backpressure from forming in the cartridge. The pressure equalizer can be a check valve.

According to another aspect of the present disclosure, when the water recycling system includes the tank, the tank can take on various forms and have different functionalities. The tank can have at least one tank inlet, at least one outlet and at least one pump for removing fluids or particles from the tank. The outlet can be fluidly connected to a clean liquid reservoir. The tank can include an internal partition located between the two outlets and the tank partition can include a passage from a first side of the tank partition to a second side of the tank partition. An outlet can be the opening of a hose attached to a float that is movably fastened to a shaft such that the float moves with the water level, and such that the opening of the hose is held below the level of the water. The pump can move water through the hose to the reservoir. Further a soil sensor can be included between the hose and the reservoir. The water recycling system can include a motor that activates a system of rollers to rotate a separation layer within the tank between two positions.

DETAILED DESCRIPTION

Figure 1:
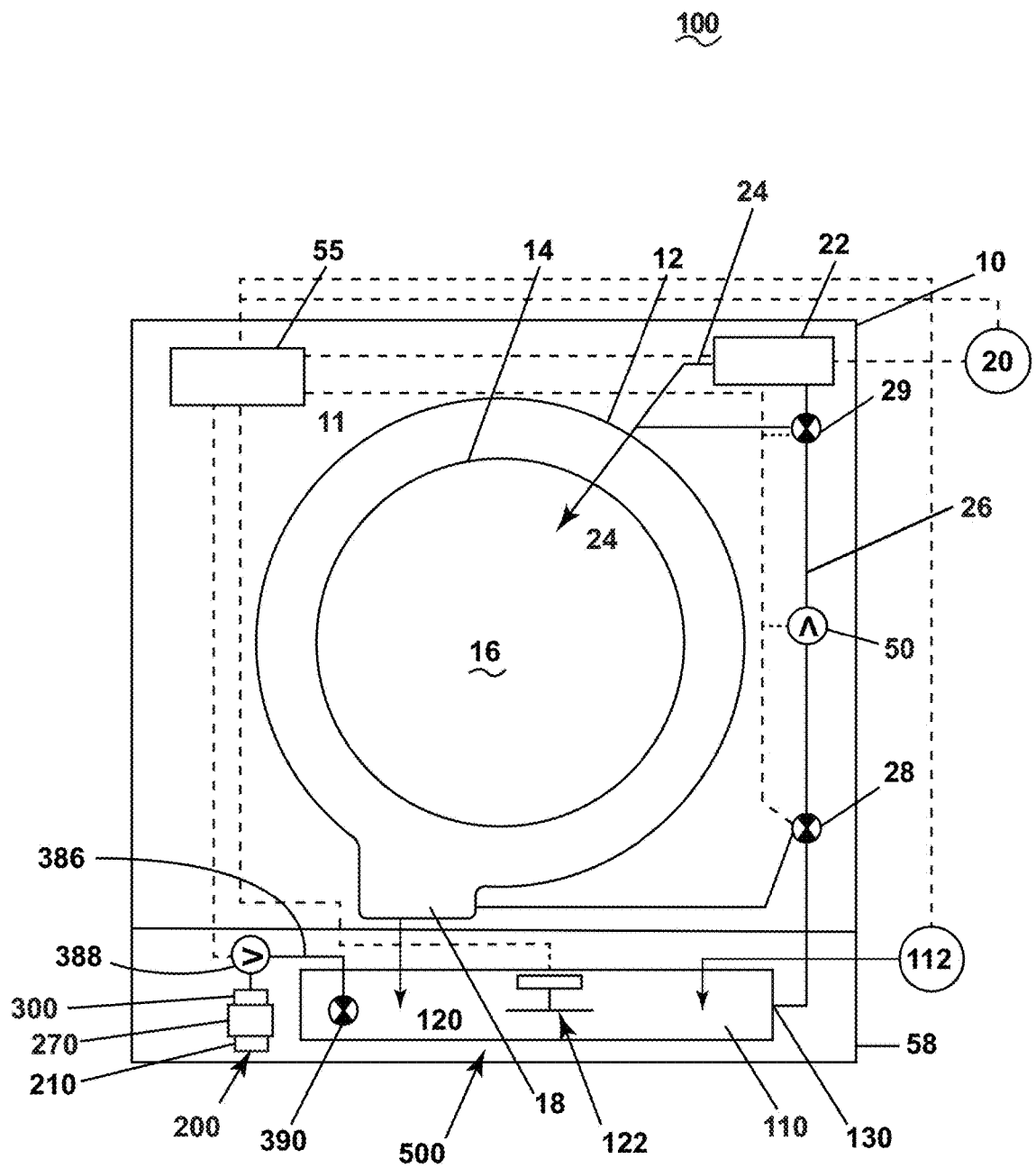
FIG. 1 is a schematic view of a household washing appliance having multiple systems, including a water recycling system for treating and recycling wash water.

FIG. 1 illustrates a laundry appliance 100 according to aspects of the present disclosure. The laundry appliance 100 can be any suitable household laundry appliance, including, but not limited to, a clothes washing machine, a stand-alone washer, a multi-tub-type washer, a drawer washer, a combination washing machine and dryer, a non-aqueous washing apparatus, a clothes refresher, a revitalizing machine, etc., all of which can have varying widths, sizes, and capacities. All of these examples of household laundry appliances can receive one or more items in a treating chamber and then perform a cycle of operation on the article. The cycle of operation can include, by way of non-limiting examples: clothes washing or clothes treating. As used in this description, the term "items" is intended to be generic to any item, single or plural, that can be treated in the laundry appliance 100, including, without limitation, laundry items, clothes, bedding, towels, and linens.

The laundry appliance 100 of FIG. 1 includes a cabinet 10 with an interior 11, in which is provided a water holding container, such as a tub 12. A laundry holding container, such as a basket 14, can be provided in the tub 12. At least one of the tub 12 or basket 14 at least partially defines a treatment chamber 16. A liquid sump 18 is fluidly coupled to the tub 12 and can at least partially be formed by the tub 12, or alternatively can be provided adjacent to or otherwise fluidly coupled with the tub 12. Alternatively, the liquid sump 18 can be a separate module that is coupled to the tub 12.

The laundry appliance 100 further includes a fresh water supply or a household water supply 20 and a treating chemistry dispenser 22, with a treating chamber inlet 24. The water supply 20 can fluidly couple directly to at least one of the tub 12 or basket 14. Additionally, or alternatively, the water supply 20 can be fluidly coupled to the dispenser 22. A water recirculation conduit 26 fluidly couples the liquid sump 18 to the treating chamber inlet 24 by way of a water treatment system 500 with a sediment tank or a water treatment tank 110 to provide a water recirculation path through the treatment chamber 16. A recirculation valve 28, a valve 29, and a recirculation pump 50 can be fluidly coupled to the recirculation conduit 26 to control the recirculation of water through the recirculation conduit 26. The dispenser 22 is fluidly connected to the household water supply 20, the treating chamber inlet 24 and also to the water recirculation conduit 26. The water recirculation conduit 26 fluidly connects the water treatment tank 110 with the dispenser 22. Alternatively, the water recirculation conduit 26 can connect the water treatment tank 110 directly to the treatment chamber 16 by way of the treating chamber inlet 24. The valve 29 directs the recirculating water directly to the treatment chamber 16 through the treatment chamber inlet 24 or the valve 29 directs the recirculating water to the treatment chamber via the dispenser 22.

The laundry appliance shown in FIG. 1 additionally contains a water recycling system for treating the used water or wash water with a liquid coagulant, separating the impurities, and recycling the clarified water in a cycle of operation. The water treatment system 500 shown in FIG. 1 includes a water treatment tank 110 and a coagulant dosing system 200. The water treatment tank 110 can optionally include an agitator 122. The water treatment tank 110 is fluidly coupled to the liquid sump 18 and a controlled inlet 112. The controlled inlet 112 can be the household water supply 20 or a valved branch from water supply 20. The water treatment tank 110 has at least one tank inlet 120 and at least one tank outlet 130. Further examples of the water recycling system are described in further detail below.

The coagulant dosing system 200 includes a coagulant cartridge 210, which is received within a cartridge housing 270. The coagulant cartridge 210 can be user-replaceable. The coagulant cartridge 210 can contain a single or multiple doses or charges of coagulant.

A fluid coupling system 300 fluidly couples the coagulant cartridge 210 to the water treatment tank 110 by way of the cartridge housing 270 and includes a dosing pump 388 fluidly coupling the coagulant cartridge 210 to the tank via a line 386, which terminates within the water treatment tank 110 with a check valve 390. The dosing pump 388 can be a metering pump, which can deliver accurate doses of coagulant. The check valve 390 can be located within the water treatment tank 110 such that it is below the anticipated water level to prevent air from contacting the coagulant exiting the line 386 or from air entering the line 386, when the check valve 390 is open.

To implement the cycles of operation, a controller 55 can also be included in the laundry appliance 100 that operably couples with and controls the various components of laundry appliance 100 including the household water supply 20, the recirculation valve 28, and the recirculation pump 50. The controller 55 operably couples with and controls components of the coagulant dosing system 200 such as cartridge housing sensors and switches, and the dosing pump 388. The controller 55 can be located within the cabinet as illustrated, or it can alternatively be located within a closure, such as a door, of the appliance.

In a cycle of operation, water can be supplied to the treatment chamber 16 from the household water supply 20 entering the treating chamber through the dispenser 22 and the treatment chamber inlet 24. Once a wash or rinse operation is complete, the wash water can be supplied from the liquid sump 18 to the water treatment tank 110 for clarification. The dosing pump 388 is activated to pump coagulant from the coagulant cartridge 210 through the line 386 into the water treatment tank 110. The check valve 390 on the line 386 opens during the operation of the dosing pump 388 such that the coagulant is emitted into the water treatment tank 110. If the agitator 122 is present, the agitator 122 is activated to mix the coagulant with the wash water. The coagulant combines with fibers, debris, and soils from the laundry to form coagulated solids that settle or precipitate out providing a layer of sludge at the bottom of the water treatment tank 110 with a layer of clarified water above the sludge. The recirculation pump 50 moves the clarified water from above the sludge through the water recirculation conduit 26 and the dispenser 22 into the tub 12 for recycling. The clarified water can be stored in the water treatment tank 110 for reuse in the current cycle of operation. Alternatively, and additionally, the clarified water can be stored for use in a subsequent cycle of operation.

Figure 2:
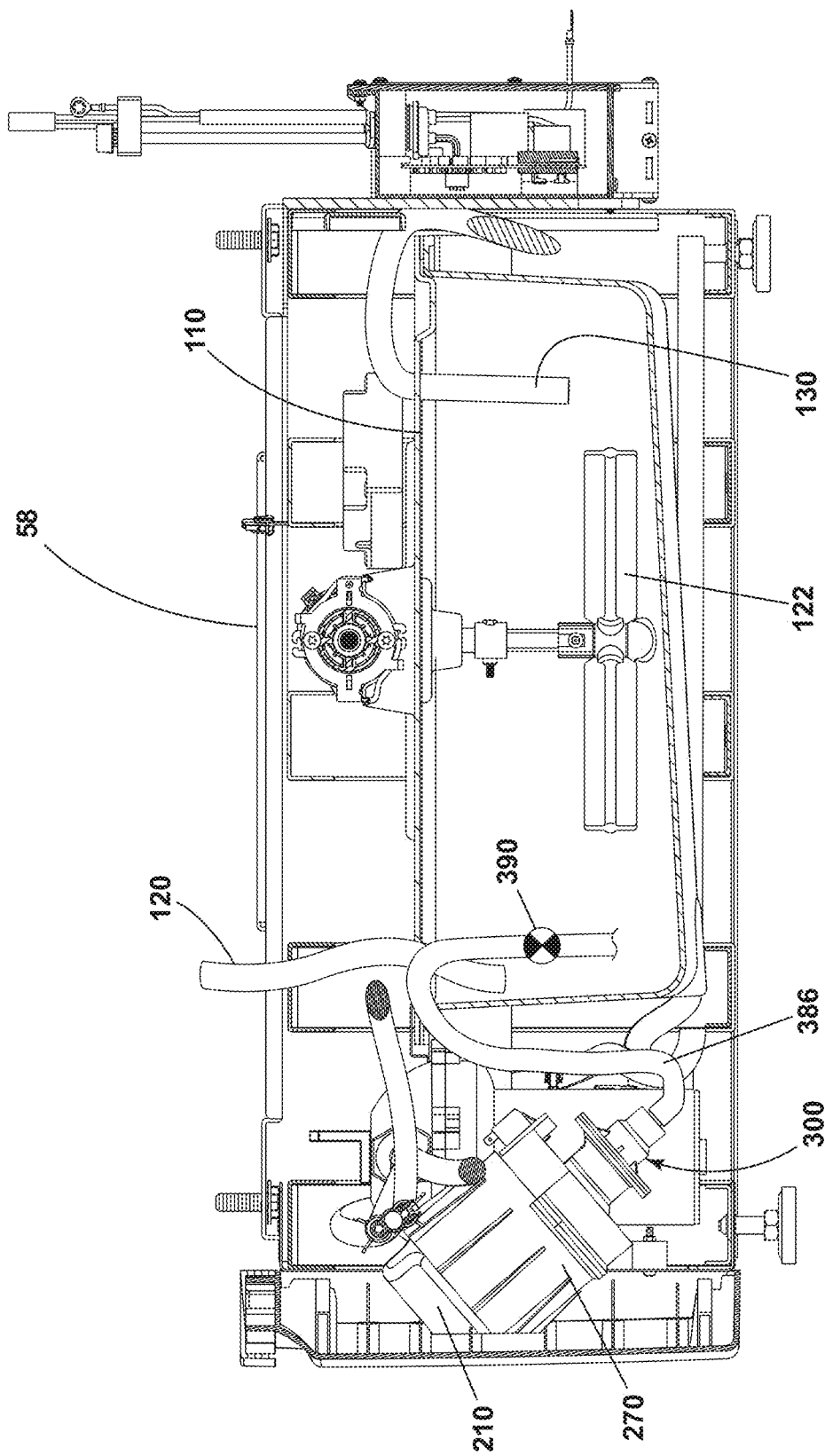
FIG. 2 is a cross-sectional view of one exemplary implementation of the water recycling system, which includes a water recycling tank, a user-replaceable cartridge holding a coagulant, and a pump fluidly coupling the cartridge to the tank.

FIG. 2 illustrates one specific implementation of the water treatment system 500 with the water treatment tank 110 and the coagulant dosing system 200, located within a pedestal 58 that can be positioned beneath the appliance or integrated with the appliance. The cartridge housing 270 is preferably located in a position that is easily accessible to the user, for example at the front of the pedestal 58 such that the user can conveniently insert the coagulant cartridge 210. The fluid coupling system 300 connects the cartridge housing to the water treatment tank 110 where the agitator 122 can assist mixing of coagulant with the wash water. The water treatment tank 110 can optionally have a slanted floor to promote separation of the coagulated solids from the clarified water.

Figure 3A:
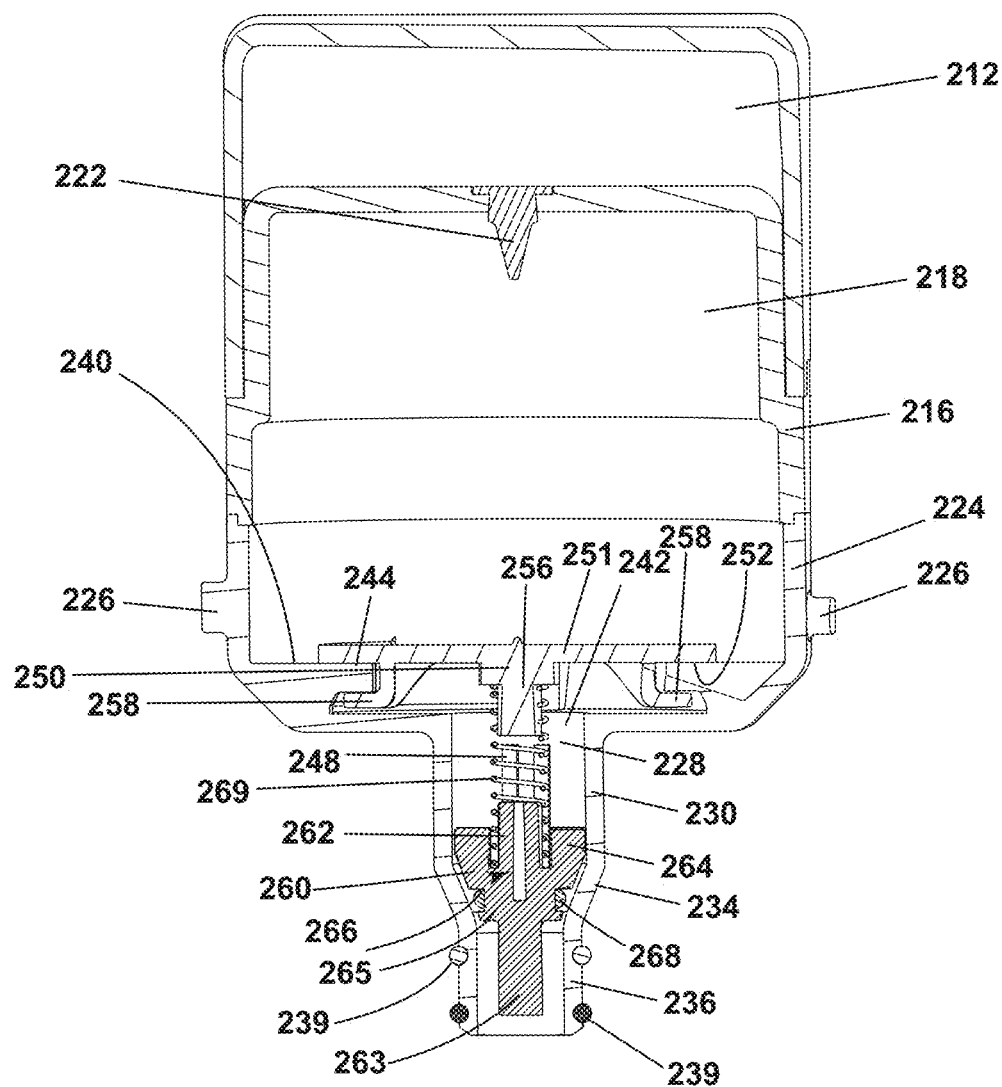
FIG. 3A is a cross-sectional view of the consumable coagulant cartridge.

Turning now to FIG. 3A, components of the coagulant cartridge 210 are shown. The coagulant cartridge 210 can hold the liquid coagulant in a sealed manner and is capable of releasing the liquid coagulant, such that it is introduced to the wash water to clarify the wash water for recycling. The coagulant cartridge 210 includes a top portion 216 and a bottom portion 224. The top portion 216 has a duckbill valve 222. The top portion 216 is affixed to the bottom portion 224 such that together, they define an interior chamber 218. The bottom portion 224 has a first end 230, a tapered portion 234, and a second end 236 that define a fluid channel 228. The second end 236 is fitted with at least two exterior O-rings 239. The bottom portion 224 has a floor 240 the partially defines the interior chamber 218. The floor 240 has an opening 242 that connects the interior chamber 218 to the fluid channel 228. The floor 240 has at least one projection 244. The interior of the fluid channel 228 has tracks 248. The bottom portion 224 can have exterior tabs 226.

The bottom portion 224 further includes a plunger holder 250 with a first side 251, a second side 252, and fluid holes (not shown). A spring shaft 256 extends from the center of the plunger holder 250 on the second side 252. At least one hook 258 extends from the second side 252. The hook 258 engages with the projection 244 to hold the plunger holder 250 in place over the opening 242 such that the spring shaft 256 extends through the opening 242 into the fluid channel 228.

In one example, the coagulant cartridge 210 has a first plunger 260 that can move in an axial direction (coaxial with the fluid channel) to contain or release the liquid coagulant. The first plunger 260 has a rear shaft 262, a forward shaft 263 and a wing base 265. The first plunger 260 further has wings 264 that attach to and extend from the wing base 265. The forward shaft 263 further includes an O-ring seat 266 fitted with a first plunger O-ring 268 located adjacent the wing base 265. The first plunger 260 is seated inside the fluid channel 228 such that the wings 264 are in the tracks 248 in the tapered portion 234. A first spring 269 sleeves the spring shaft 256 and the rear shaft 262. The first spring 269 abuts the wing base 265.

Figure 3B:
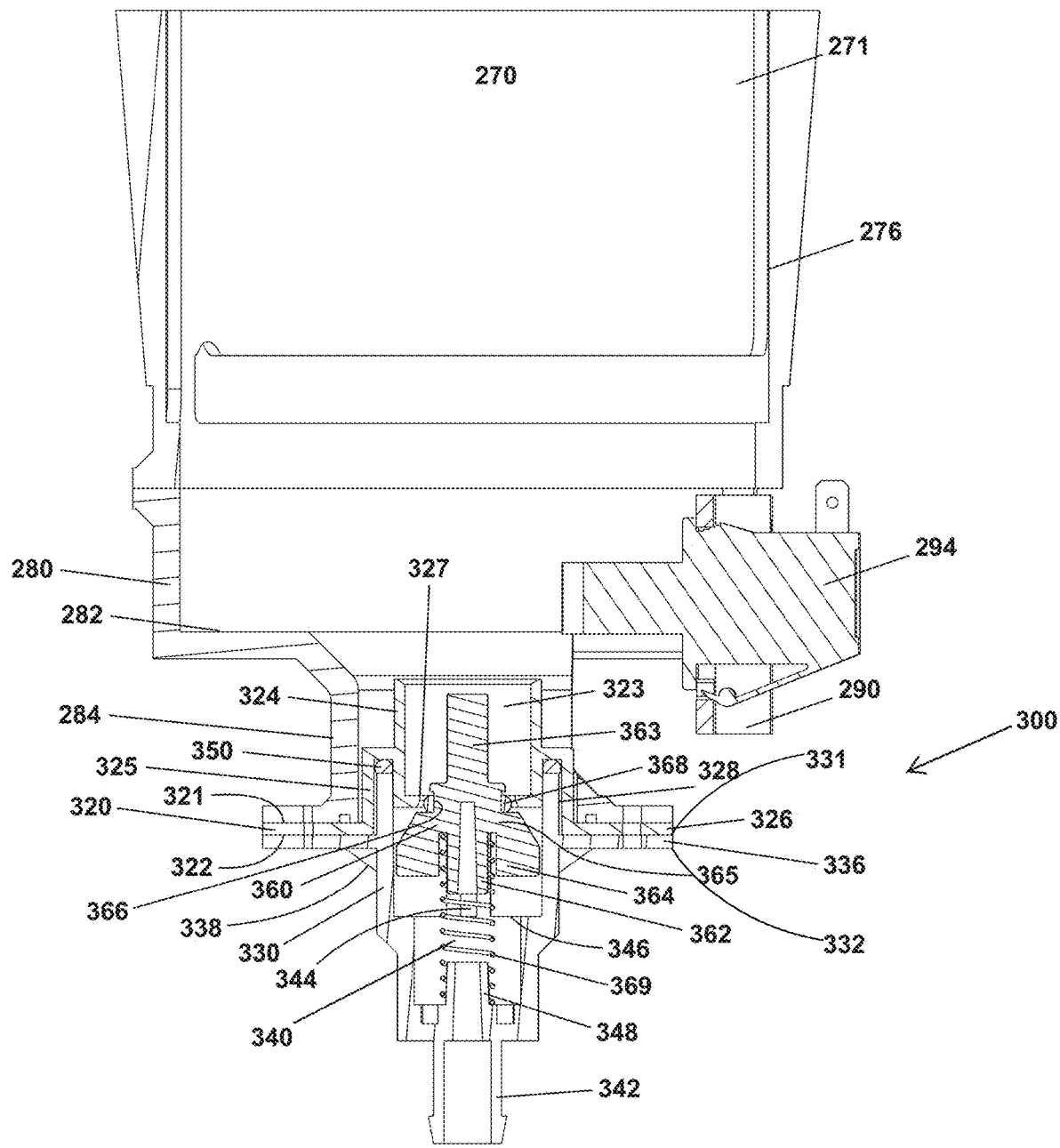
FIG. 3B is a cross-sectional view of the cartridge housing without the cartridge inserted.

The fluid coupling system 300 engages with the cartridge housing 270 as shown in FIG. 3B and has a second plunger 360 that can move in an axial direction, coaxial with a central fluid passage 340 to release the liquid coagulant. The cartridge housing 270 includes a receiving cup 271, a housing bracket 280, a switch bracket 290, and a switch 294. The fluid coupling system 300 comprises a retainer 320, a holder 330, a second plunger 360, a second plunger O-ring 368, and a second spring 369. The retainer 320 has a first side 321 and a second side 322 with a central opening 323. The retainer 320 further consists of the following concentric rings: a central ring 324, a receiving ring 325, a first fastening ring 326. The first fastening ring extends radially from the central opening 323. The central ring 324 and receiving ring 325 are joined and spaced apart to form a recess 328. The central ring 324 and receiving ring 325 surround the central opening 323 are on the first side 321 and extend in a direction normal to the plane of the central opening 323 and to the first fastening ring 326.

The holder 330 has a first side 331 and a second side 332 and the central fluid passage 340. The holder 330 consists of a holder ring 334 that extends perpendicularly away from the first side 331, and a second fastening ring 336 that extends radially from the central fluid passage 340. The holder 330 can have support ribs 338 on the second side 332. The central fluid passage 340 extends away from the holder ring 334 on the second side 332 and ends with a hose barb 342. The interior of the central fluid passage 340 has at least one plunger track 344 that extends at least part of the length of the central fluid passage 340. The interior of the central fluid passage 340 further includes a stopper face 346 and a spring shaft tube 348 surrounding the central fluid passage 340.

Similar in structure to the first plunger 260, the second plunger 360 has a rear shaft 362, forward shaft 363, wings 364, base 365, and O-ring seat 366. The wings 364 are attached to the rear shaft 362 at a base 365. The second O-ring 368 on the O-ring seat 366 is held between the retainer 320 and the second plunger 360. A second spring 369 sleeves the rear shaft 362 and the spring shaft tube 348.

When the cartridge housing 270 and fluid coupling system 300 are assembled, the first fastening ring 326 abuts the channel lip 285 and the second fastening ring 336 abuts the first fastening ring 326. The recess 328 between the central ring 324 and receiving ring 325 of the retainer 320 is complementary in shape to the holder ring 334 of the holder 330. A retainer O-ring 350 is seated in the recess 328 between the retainer 320 and the holder 330. The wings 364 engage the plunger track 344 inside the central fluid passage 340. Alignment of the channel lip 285, first fastening ring 326, and the second fastening ring 336 allow fasteners to be employed.

It will be understood that there at least two ways that the fluid coupling system 300 actuates flow between the coagulant cartridge 210 and the cartridge housing 270. In both, the first and second plungers 260, 360 are normally biased closed by the first and second springs 269, 369, respectively. Axial movement of the first and second plungers 260, 360 relative to each other causes them to open such that fluid flow is enabled between them. In a first non-limiting example, axial movement of the first and second plungers 260, 360 relative to each other is caused by insertion of the coagulant cartridge 210 into the cartridge housing 270, causing the first and second plungers 260, 360 to contact each other and move axially to open. Rotation of the coagulant cartridge 210 within the cartridge housing 270 locks the cartridge in place. In a second non-limiting example, axial movement of the plungers is caused by rotation of the coagulant cartridge 210 within the cartridge housing 270 after it is fully inserted.

Figure 4:
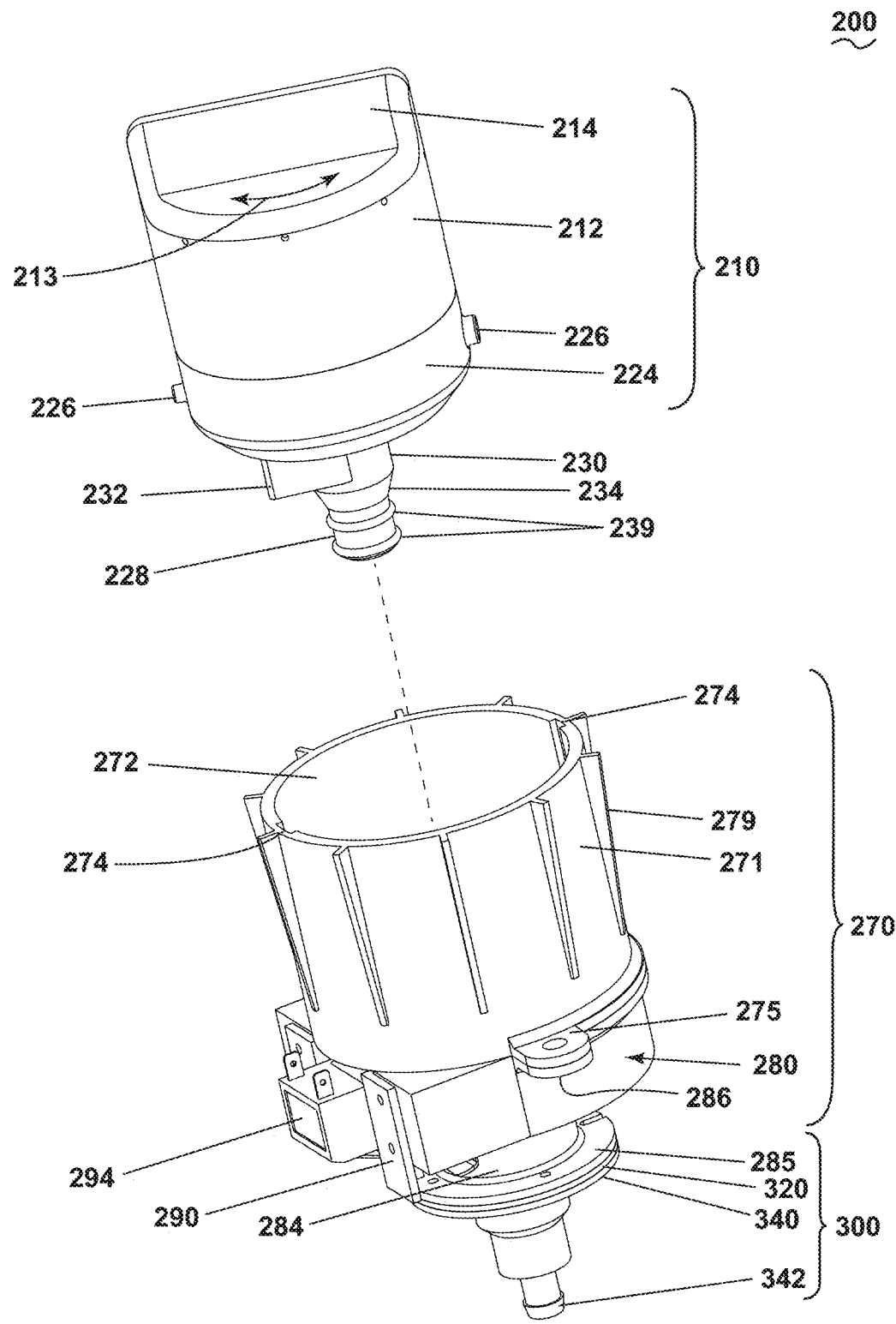
FIG. 4 is a side perspective view of the cartridge aligned with and ready for insertion into a cartridge housing.

Turning now to FIG. 4, the pre-insertion alignment position of the coagulant cartridge 210, cartridge housing 270 and the fluid coupling system 300 is shown. The interior surface 272 of the receiving cup 271 has a guide groove 274 that extends part of the length of the receiving cup 271. Near the bottom of the receiving cup 271 the guide groove 274 connects to a slot 276 that extends less than halfway around the interior surface 272. The exterior surface can have fastening tabs 275 and ribs 279. The housing bracket 280 has a U-shape and is bridged by a base surface 282. In the base surface 282 is an opening that connects to a channel 284 with a channel lip 285. Further, the housing bracket 280 has fastening tabs 286 and the mouth of the U-shaped housing bracket 280 is spanned by the switch bracket 290. The switch bracket 290 holds the switch 294.

With the cartridge housing 270 preferably located at the front of the appliance, the user can more easily install the coagulant cartridge 210. The installation of the cartridge begins with reference to FIG. 4, where the coagulant cartridge 210 is shown exteriorly of and aligned with the cartridge housing 270 in a pre-insertion position. In this position, it is easy to see that the coagulant coagulant cartridge 210 includes a cap 212 that can be imprinted or textured with text or symbols 213 to instruct the user, and the cap may also have a grip 214. Tabs 226 of the coagulant cartridge 210 align with guide grooves 274 in the cartridge housing 270. When the tabs 226 are within the guide grooves 274, the coagulant cartridge 210 is indexed relative to the housing and ready for insertion. Further, the first end 230 has a wedge-shaped switch arm 232 extending away from the fluid channel 228. When the coagulant cartridge 210 is fully inserted and rotated into position within the cartridge housing 270, the switch arm 232 interacts with the limit switch 294 to signal the controller 55 that the coagulant cartridge 210 is present.

The coagulant cartridge 210 can be configured to prevent a low back pressure forming as the cartridge is emptied. To accomplish this, the cartridge can have a pressure relief, such as a check valve, or it can have a variable volume, which reduces in volume as the coagulant is dispensed, such as with collapsible container. For example, the top portion 216 can be a flexible material.

Figure 5A:
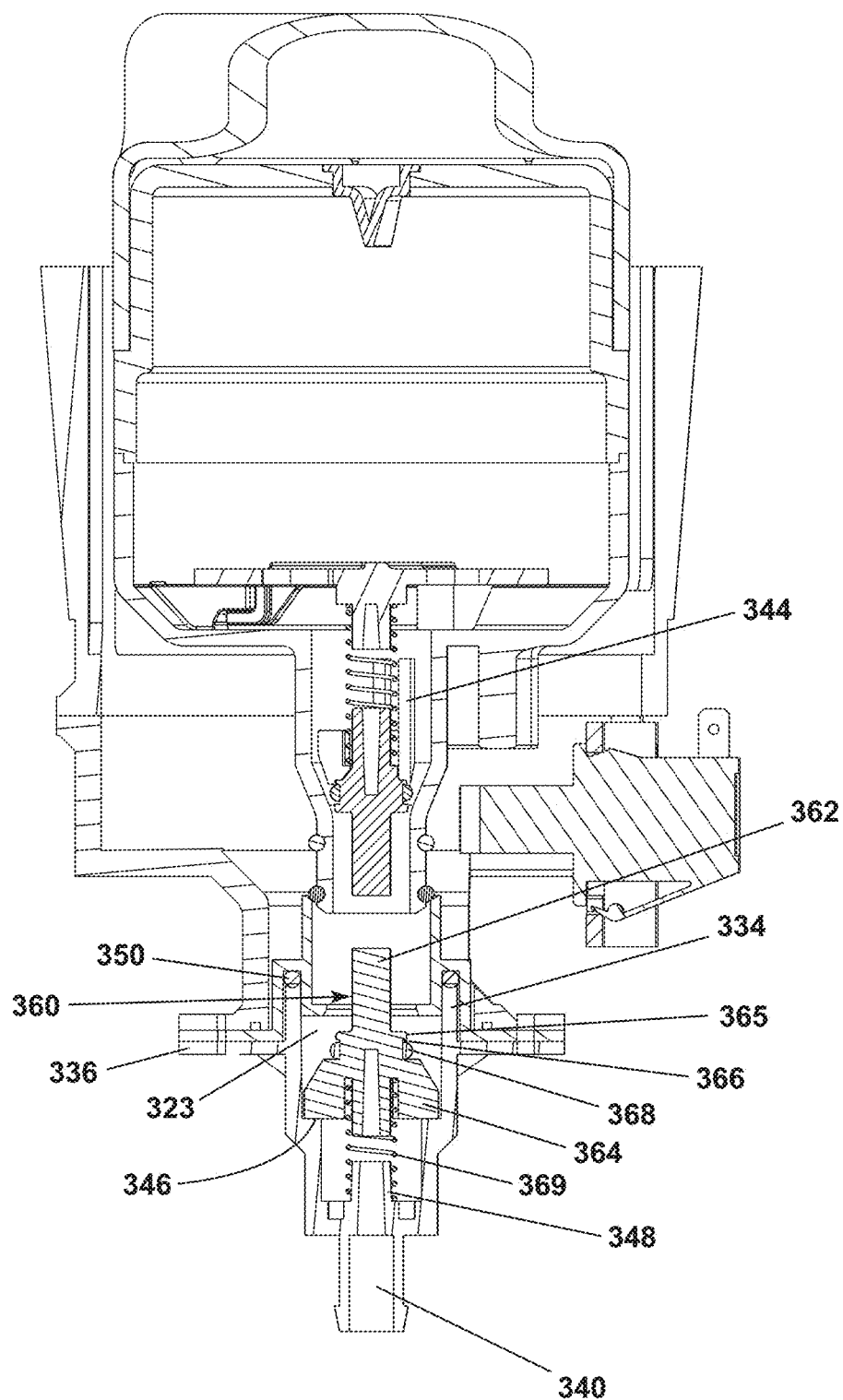
FIG. 5A is a cross-sectional view of the cartridge of FIG. 3A inside the cartridge housing in a first pre-coupling position where the cartridge is in contact with the cartridge housing.
Figure 5B:
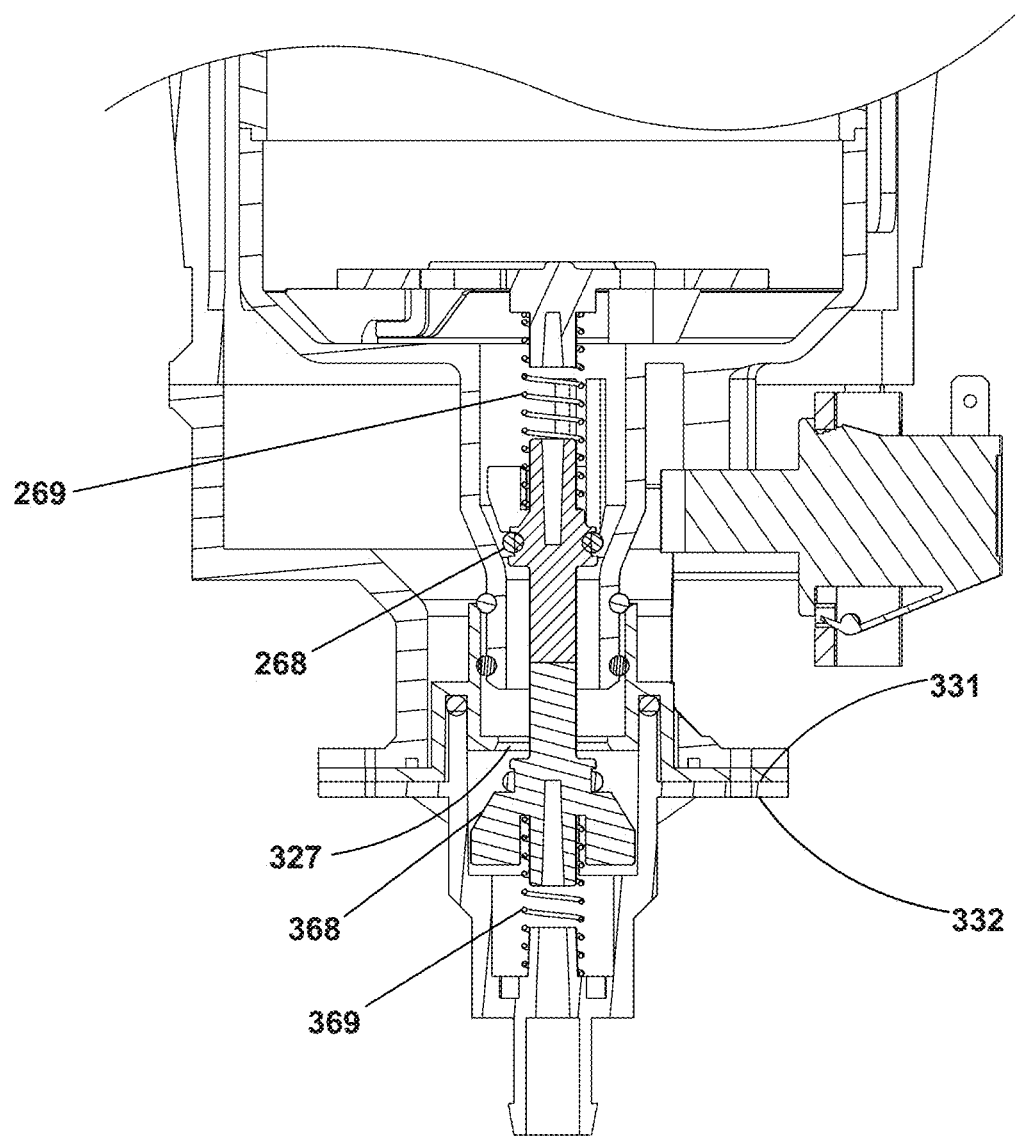
FIG. 5B a cross-sectional view of the cartridge of FIG. 3A inside the cartridge housing in a second pre-coupling position where the fluid channel of the cartridge is in contact with the fluid coupling system.
Figure 5C:
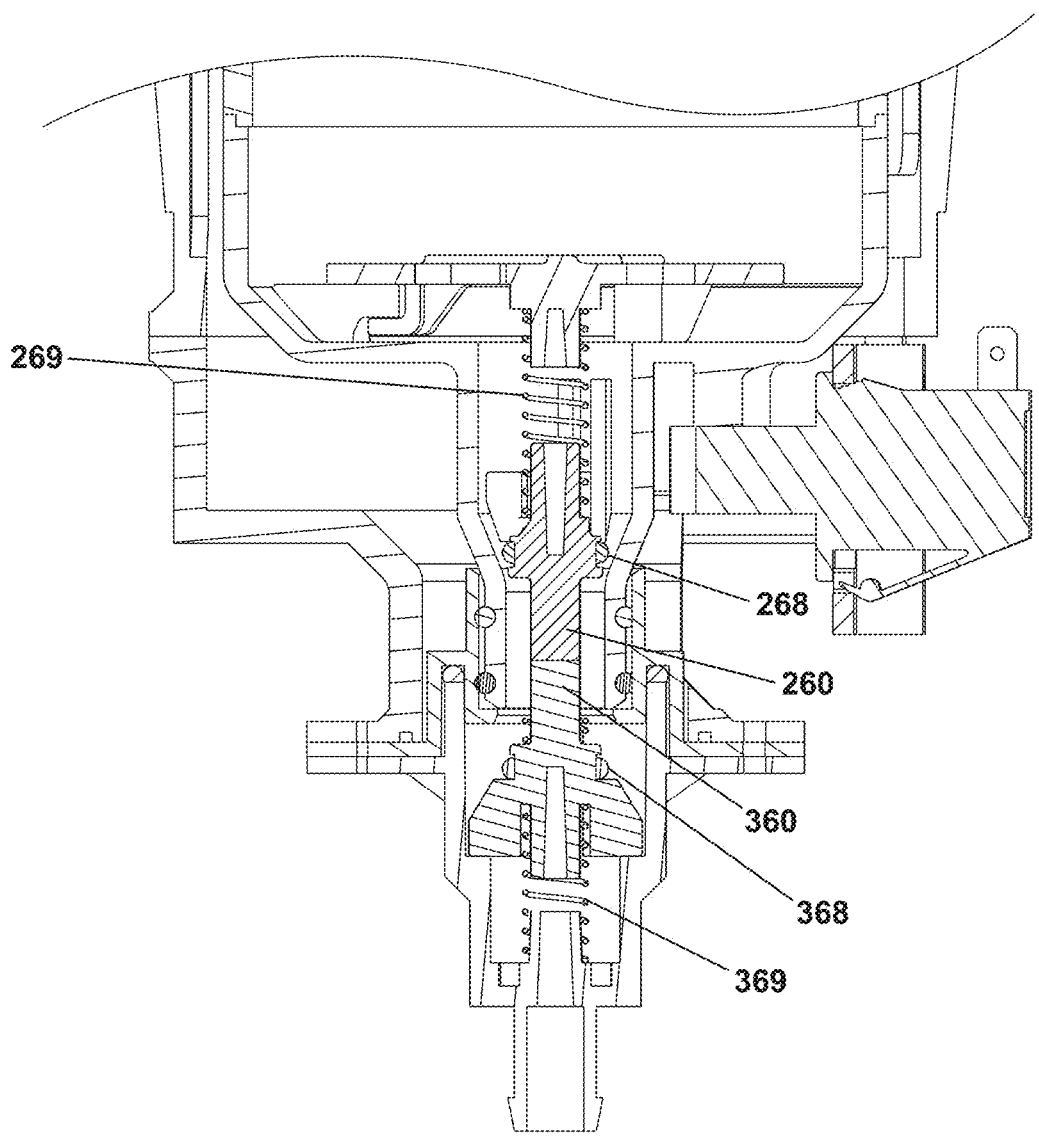
FIG. 5C a cross-sectional view of the cartridge of FIG. 3A inside the cartridge housing of FIG. 3B in a coupled position. The cartridge is rotated 160 degrees from the first pre-coupling position and the fluid pathway is fully open.

Turning now to FIGS. 5A, 5B, and 5C, the installation of the coagulant cartridge 210 with the cartridge housing 270 and fluid coupling system 300 is illustrated. In a first pre-coupled position as shown in FIG. 5A, the coagulant cartridge 210 is inserted into the receiving cup 271 when the tabs 226 are engaged with the guide grooves 274. In this configuration shown in FIG. 5A, the fluid channel 228 and central fluid passage 340 are sealed and the liquid coagulant is sealed inside the coagulant cartridge 210. The first spring 269 is compressed between the plunger holder 250 and the first plunger 260, and the second spring 369 is compressed between the second plunger 360 and the base of the spring shaft tube 348. The first plunger 260 and the second plunger 360 have first and second plunger O-rings 268 and 368 that abut and seal the fluid channels when in the closed position. The first plunger O-ring 268 abuts the interior of the fluid channel 228. The forward shaft 263 of the first plunger 260 abuts the forward shaft 363 of the second plunger 360. The second plunger O-ring 368 abuts the edge of the fluid passage opening 327 in the retainer 320. In this position, the fluid channel 228 is blocked by the first plunger 260 sealed by the first plunger O-ring 268. The central fluid passage 340 is blocked by the second plunger 360, and sealed by the second plunger O-ring 368. The first plunger 260 and the second plunger 360 are held in a closed position by the first spring 269 and the second spring 369, respectively.

In a second pre-coupled position as shown in FIG. 5B, the coagulant cartridge 210 is moved further into the cartridge housing 270 The first and second plungers 260 and 360 are pressed together, the first and second springs 269, 369 are compressed, and the first and second plunger O-rings 268, 368 move away from the interior projections within the fluid channel, thereby unsealing the fluid channel. The first spring 269 is compressed and the first plunger O-ring 268 is separated from the tapered portion 234 of the fluid channel 228 such that the fluid channel 228 is no longer blocked or sealed. The second plunger O-ring 368 is also separated from the fluid passage opening 327 such that the central fluid passage 340 is no longer blocked or sealed.

FIG. 5C illustrates a fully inserted position of the coagulant cartridge 210 when the tabs 226 are in the slot 276. The coagulant cartridge 210 is rotated to the configuration shown in FIG. 5C, which can be any number of degrees, but is illustrated as 160 degrees. In this stop position, the forward shaft 263 abuts the forward shaft 363, and the first spring 269 and the second spring 369 are compressed relative to the configuration shown in FIG. 5A. The wings 364 of the second plunger 360 abut the stopper face 346. The switch arm 232 is in contact with the switch 294. The stopper face 346 is designed in such a way as to stop the second plunger 360 from moving too far. Once the coagulant cartridge 210 is inserted completely and rotated 160 degrees relative to the initial position, the switch arm 232 contacts the switch 294.

Figure 6:
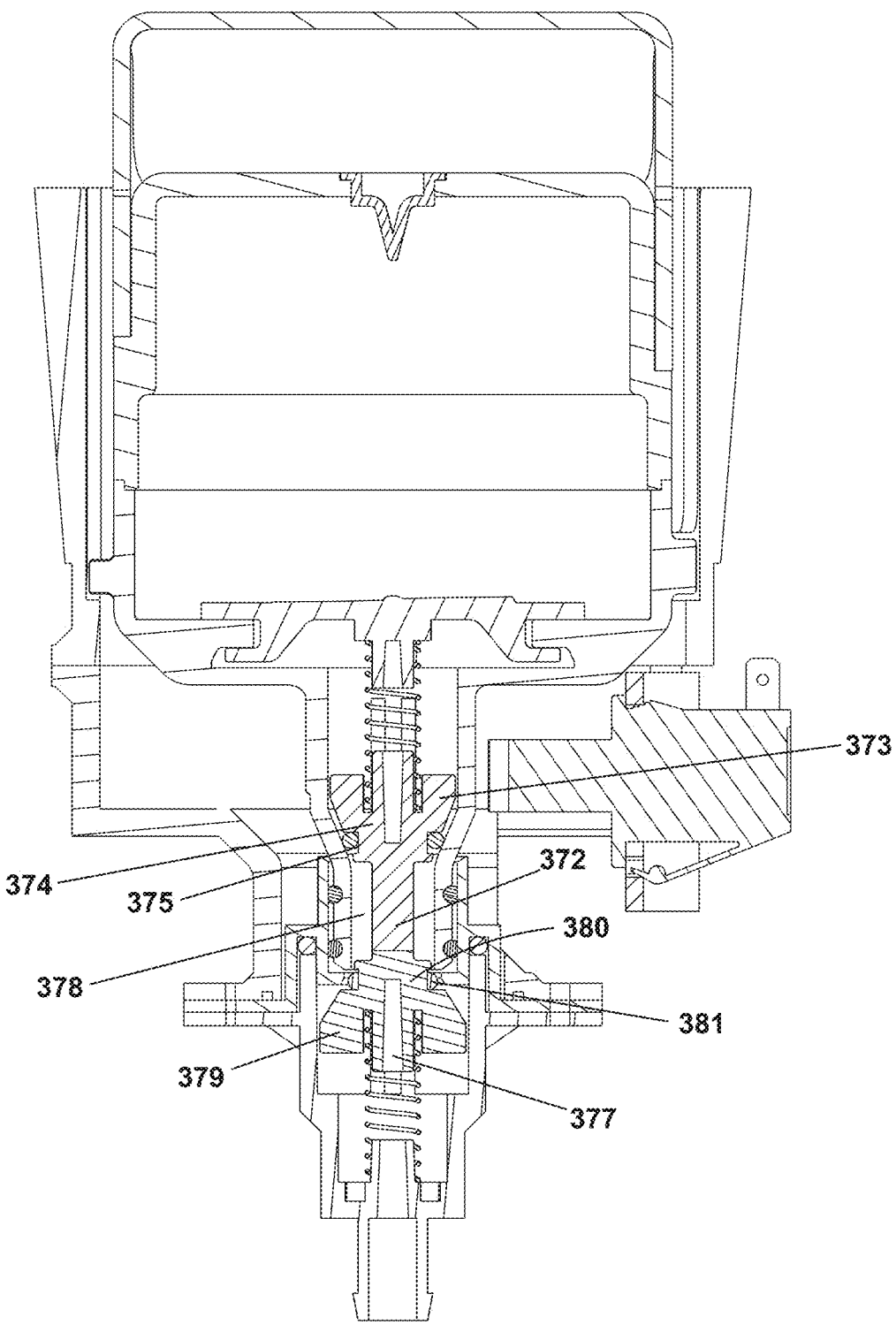
FIG. 6 is a cross-sectional view of a push-rotate cartridge inside a cartridge housing in a closed first position. The plunger in the cartridge is in contact with the plunger in the fluid coupling system and the fluid pathways are blocked and sealed.

A second version of a coagulant cartridge 210, cartridge housing 270, and fluid coupling system 300 is shown in FIG. 6. This "push-and-turn" cartridge, the cartridge, once indexed, is pushed into the housing and then rotated to place the coagulant cartridge 210 in the operational position. In this case, the coagulant cartridge 210 has a first cammed plunger 370 that rotates within the cartridge to open the fluid channel 228 to allow the coagulant to flow out. The cammed plunger 370 has a rear shaft 371, forward shaft 372, wings 373, base 374 and O-ring seat 375. The fluid coupling system 300 has a second cammed plunger 376 with a rear shaft 377, a forward shaft 378, wings 379, base 380, and O-ring seat 381. In this case the forward shaft 372 of the first cammed plunger 370 and the forward shaft 378 of the second cammed plunger 376 have complementary curved profiles that are wedge shaped cammed surfaces.

Figure 7A:
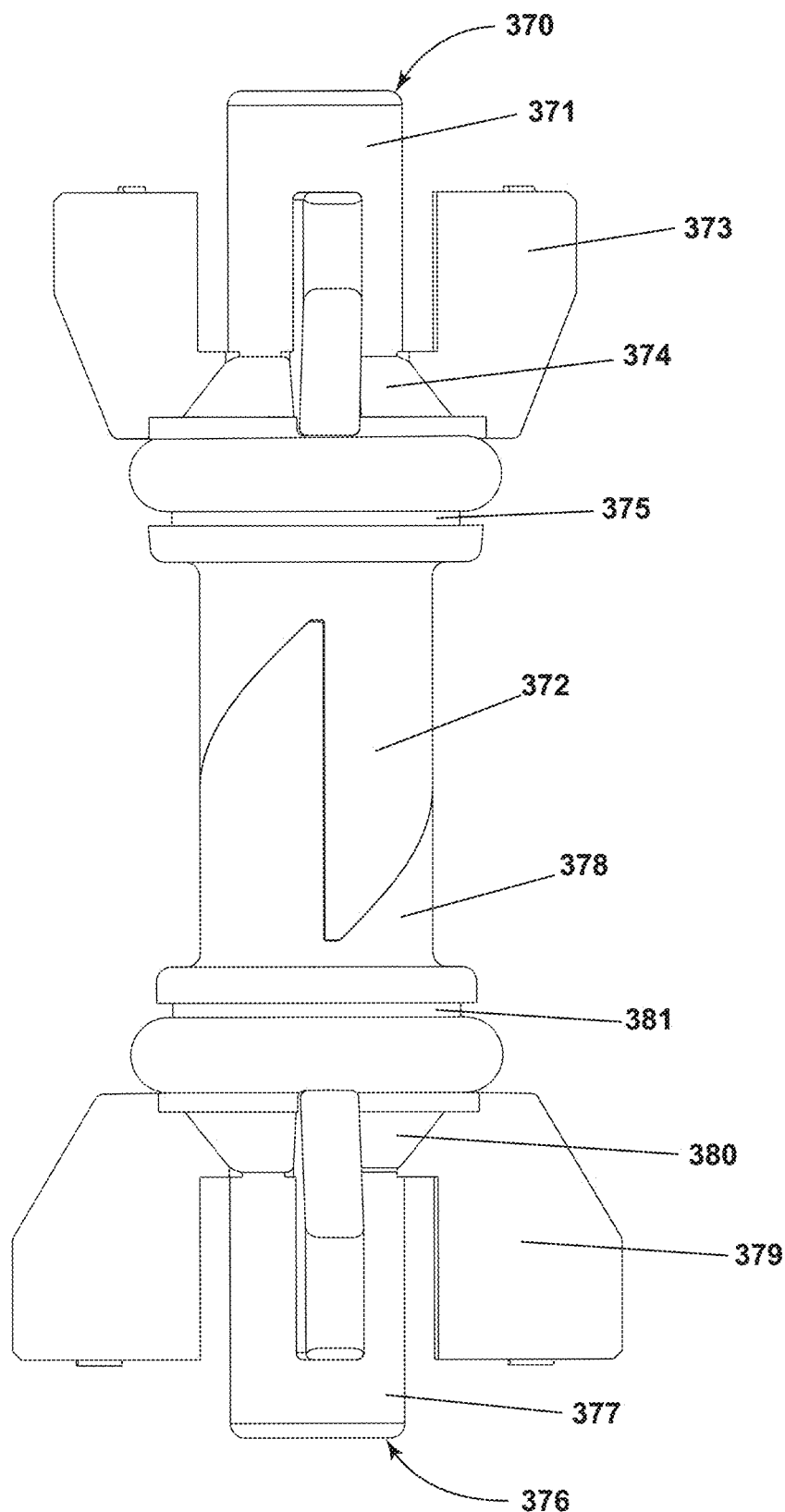
FIG. 7A is a perspective view of the plungers that form the push-rotate coupling mechanism in the cartridge of FIG. 6 in a first position where the plungers are pushed together.
Figure 7B:
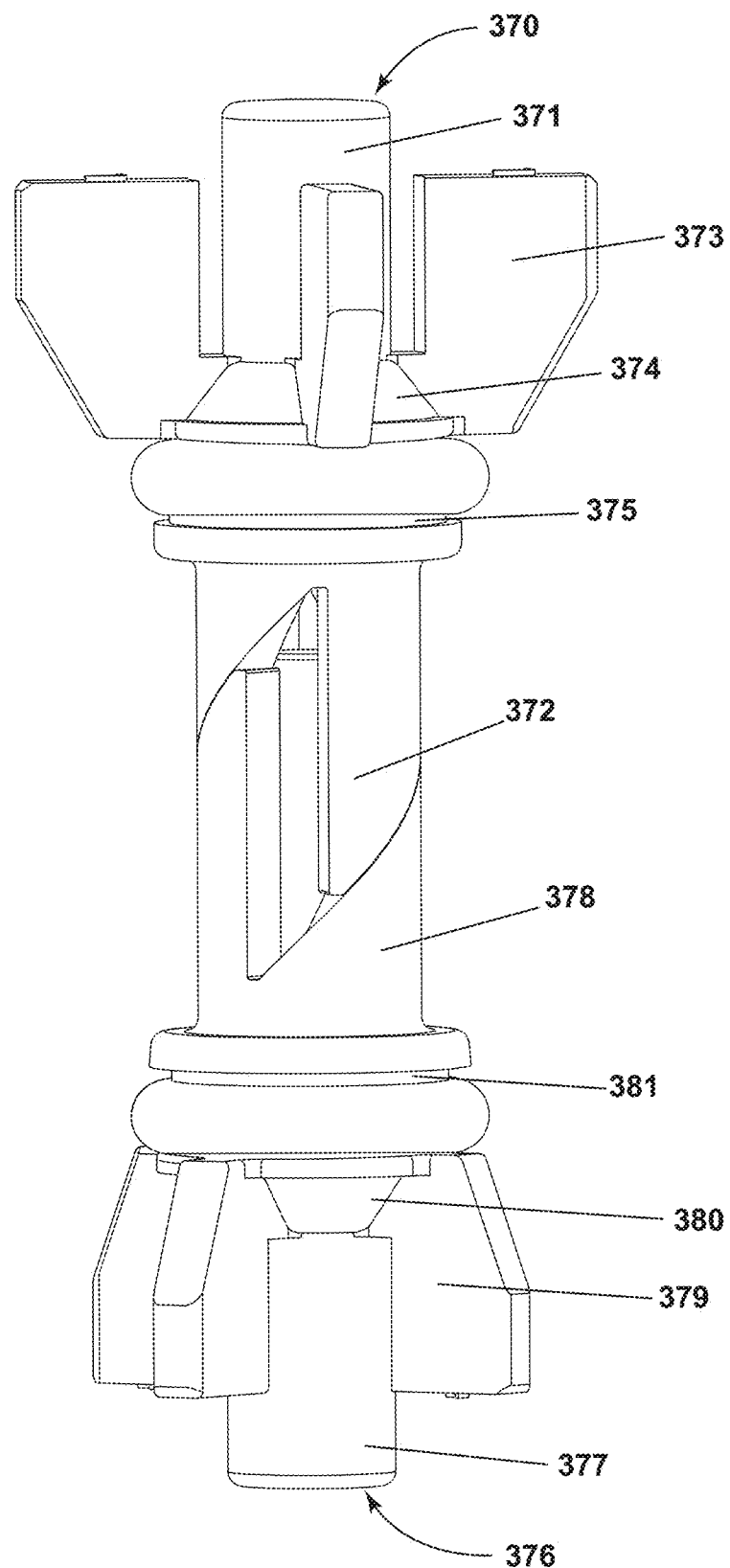
FIG. 7B a perspective view of the plungers that form the push-rotate coupling mechanism of the cartridge of FIG. 6 in a second position where the plungers are partially pushed apart due to rotation of the cartridge and the fluid pathways are partially opened.
Figure 7C:
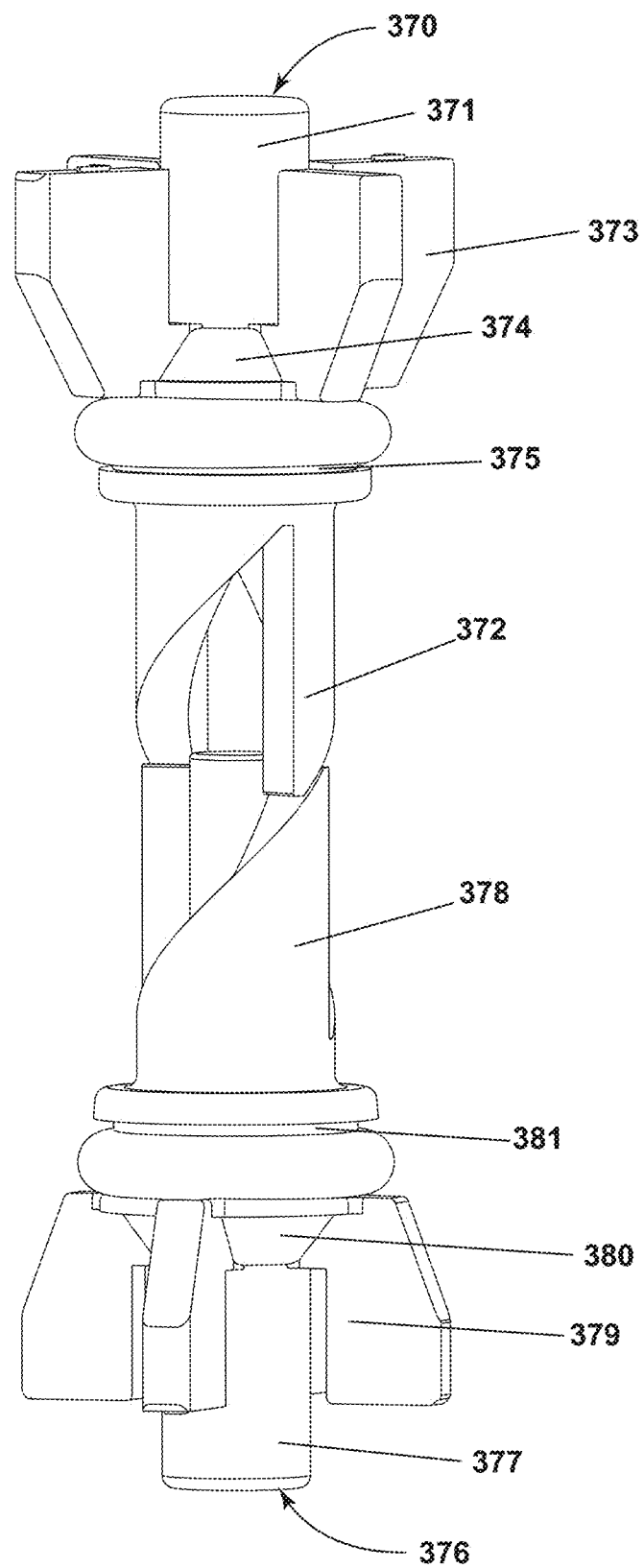
FIG. 7C a perspective view of the plungers of the push-rotate cartridge of FIG. 6 in an open third position where the plungers are fully separated due to rotation of the cartridge and the fluid pathways are fully open.

The first cammed plunger 370 is held by spring action force similarly to the previous example, and seals the fluid channel 228 in a similar way. Similarly, the second cammed plunger 376 is held in place inside the fluid coupling system 300. FIG. 7A shows the interaction of the first cammed plunger 370 with the second cammed plunger 376 when the coagulant cartridge 210 is inserted in the cartridge housing 270. The curved profiles of the forward shaft 378 and the second cammed plunger 376 match and fit together in the closed position FIG. 7B shows the positions of the first cammed plunger 370 and second cammed plunger 376 after a partial rotation of the coagulant cartridge 210. The plungers push against each other due to the curved profile and due to the spring action. FIG. 7C shows the positions of the first and second cammed plungers 370, 376 when the cartridge has been inserted completely and rotated. The fluid channel 228 and central fluid passage 340 are open to allow liquid coagulant to flow. The wings 373 and wings 379 are fixed inside their respective tracks 248, 344 so the first cammed plunger 370 will not rotate inside the coagulant cartridge 210 and second cammed plunger 376 will not rotate inside the cartridge housing 270.

Figure 8:
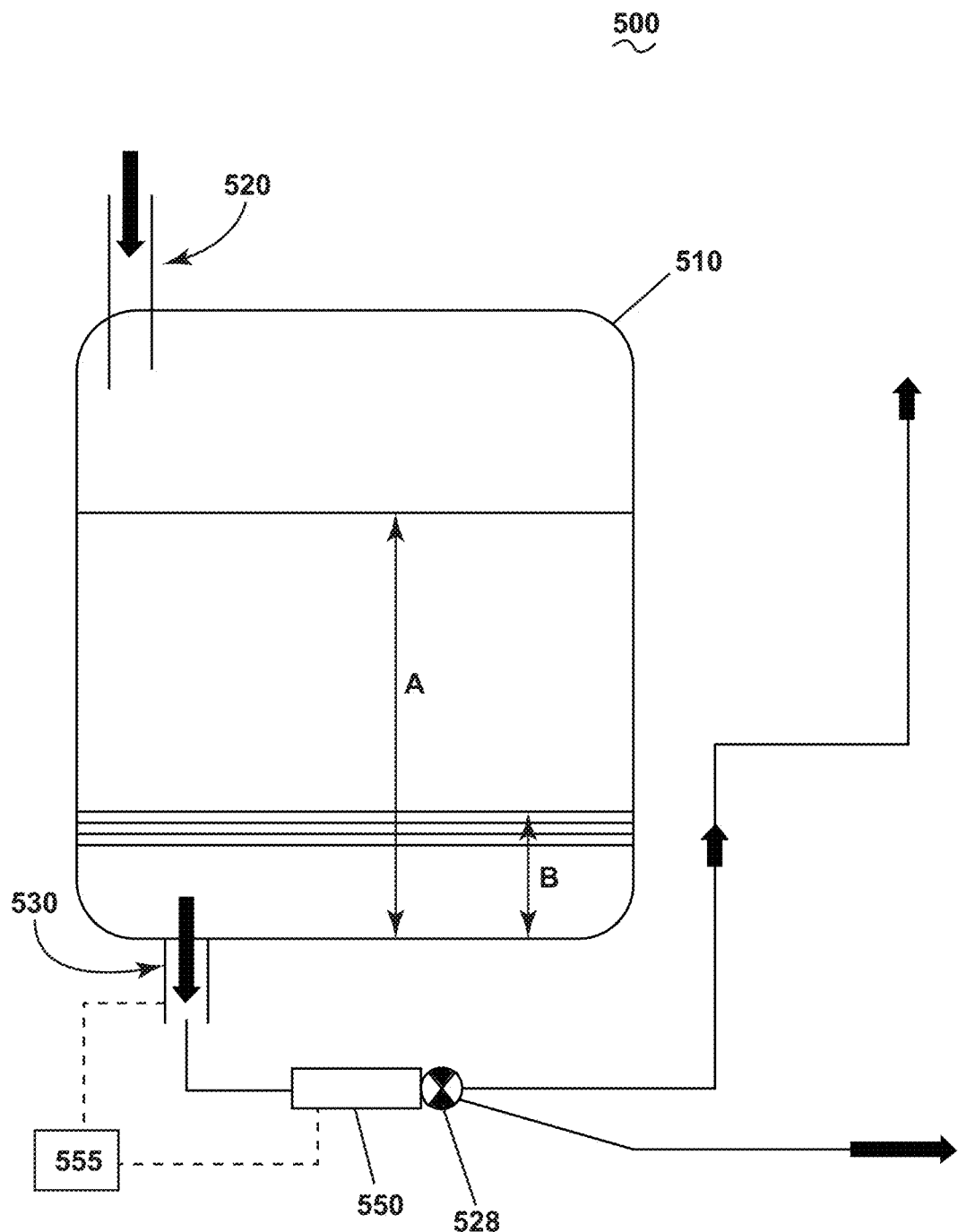
FIG. 8 is a schematic view of a wash water treatment tank with a single inlet and a single outlet, which is fluidly coupled to a diverter valve.
Figure 9:
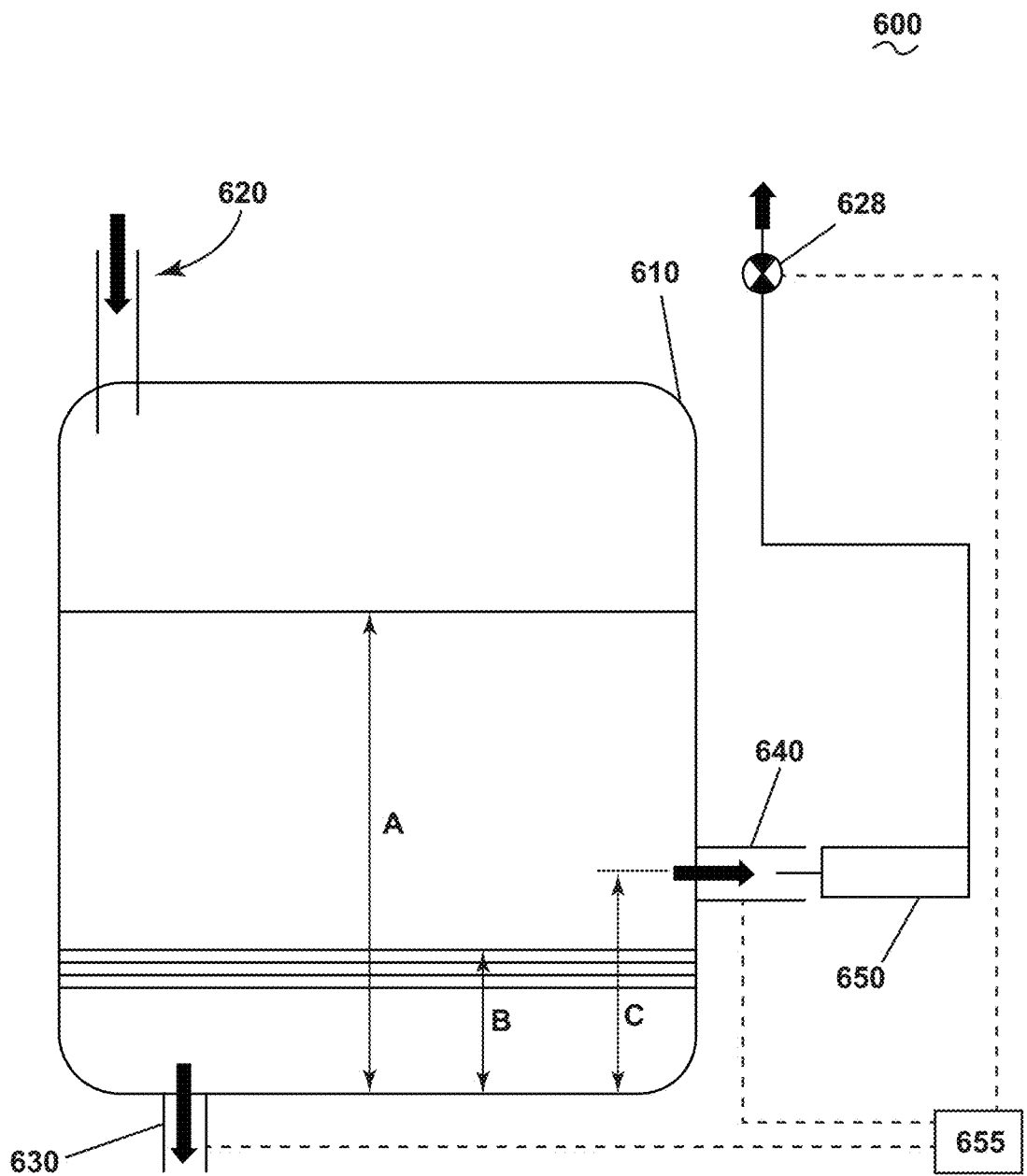
FIG. 9 is a schematic view of a wash water treatment tank with an inlet and two outlets, one of the outlets located higher in the tank than the other, whereby sediment can be removed via the lower outlet and clarified water can be removed from the higher outlet.
Figure 10:
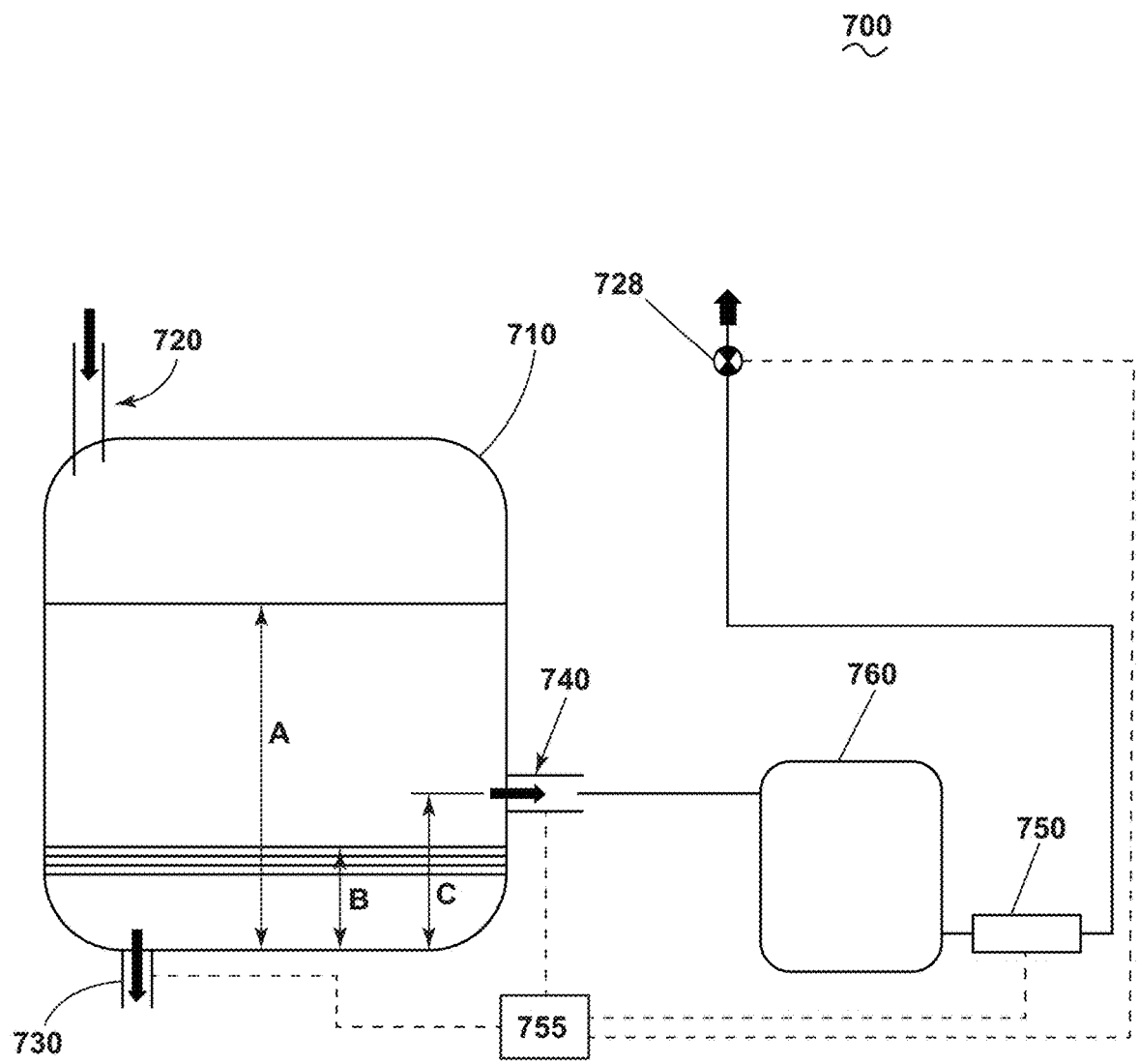
FIG. 10 is a schematic view of the wash water treatment tank of FIG. 9, with the higher outlet being fluidly coupled to a reservoir.
Figure 11:
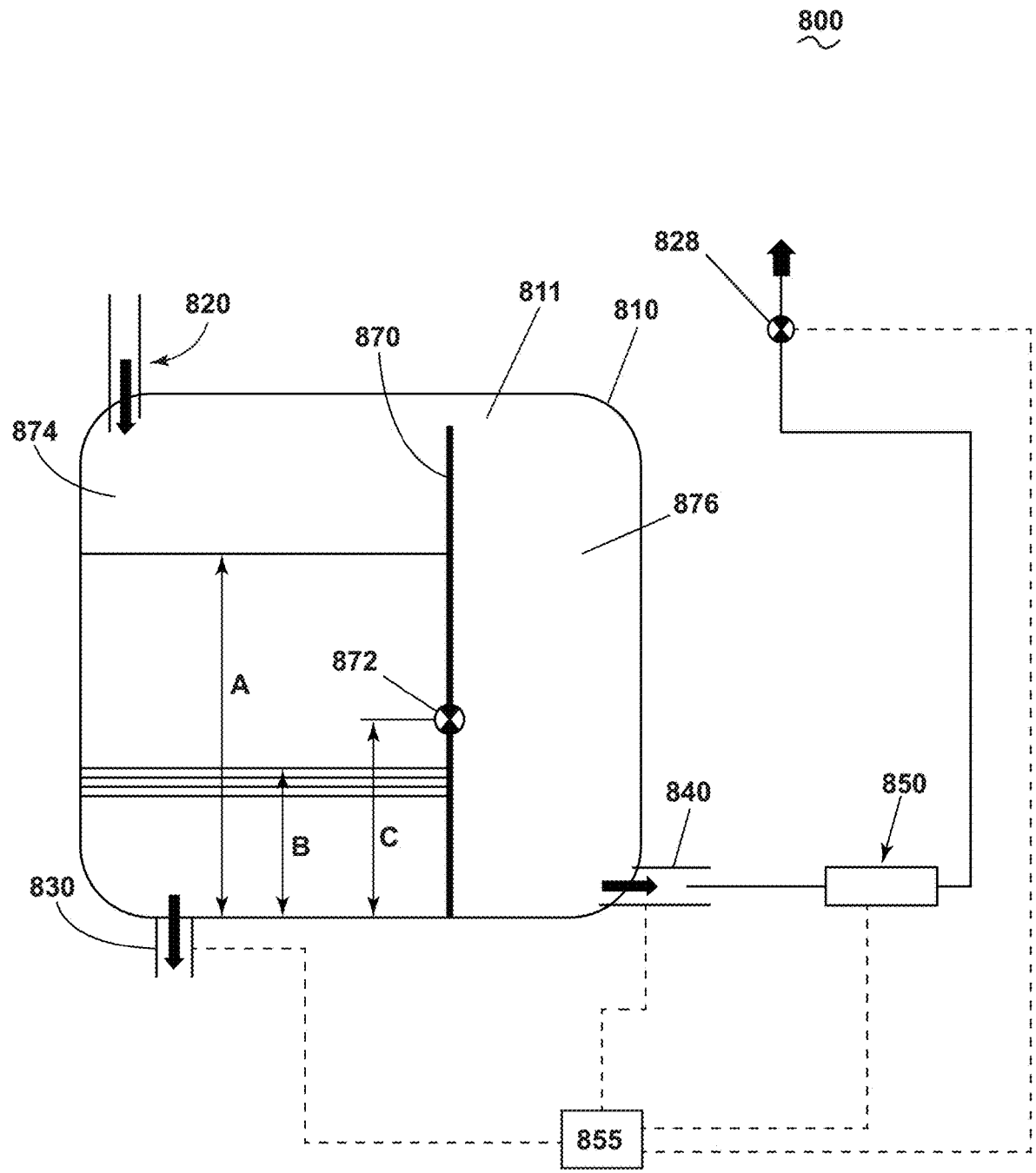
FIG. 11 is a schematic view of a wash water treatment tank with an internal partition, which divides the interior of the tank into a treating portion and a reservoir portion.
Figure 12:
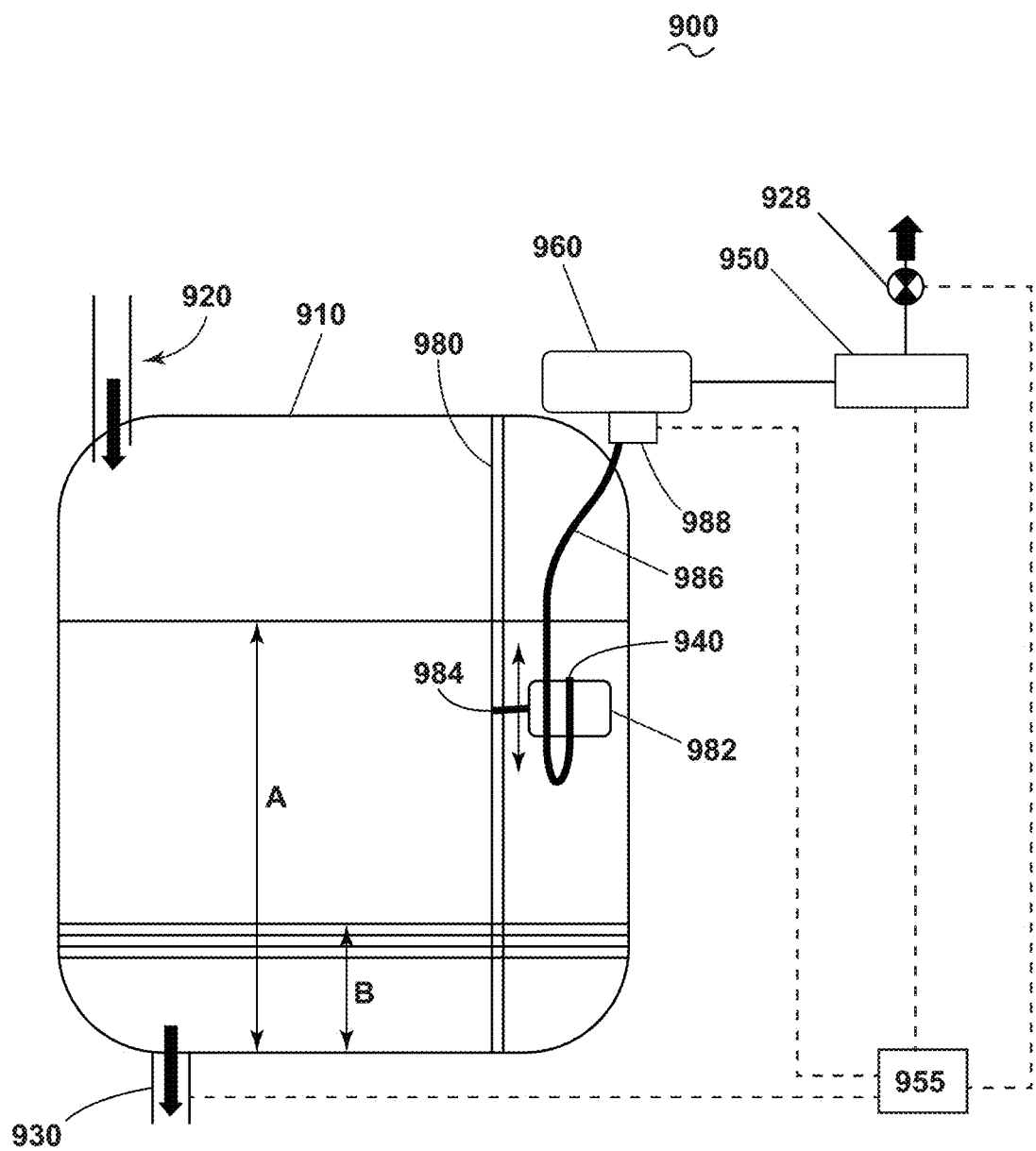
FIG. 12 is a schematic of a wash water treatment tank with a float.
Figure 13:
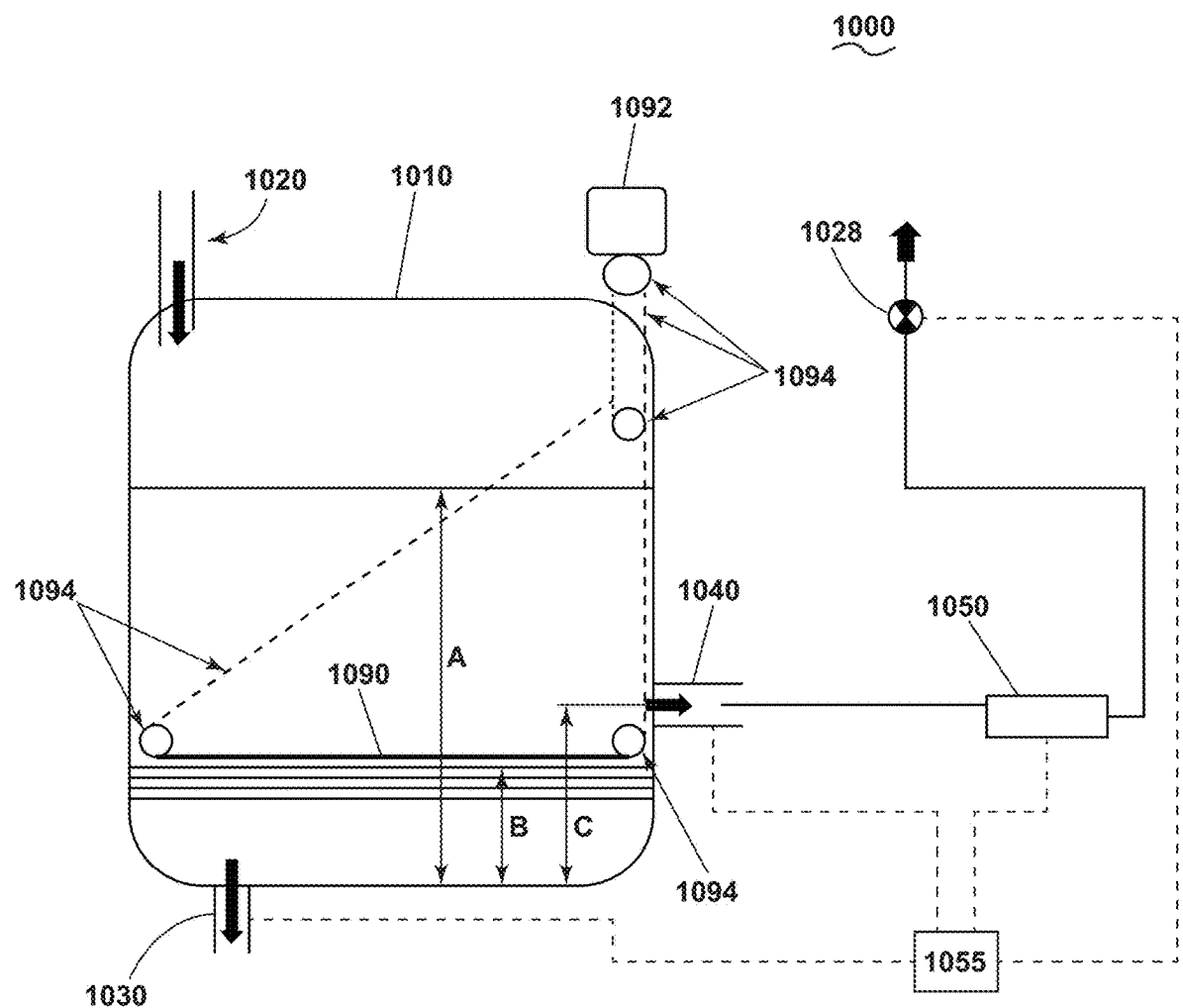
FIG. 13 is a schematic of a wash water treatment tank with a motorized barrier.

The water treatment system receives the liquid coagulant and the wash water and the water treatment system is configured to separate the clarified water for recycling. Any of the examples of the coagulant cartridge 210 described here can be used in combination with any of the following examples of water treatment system. One non-limiting example of the water treatment system 500 of FIG. 1 is shown in FIG. 8. The water treatment system 500 includes a water treatment tank 510, a recirculation valve 528, a pump 550, and a controller 555. The water treatment tank 510 includes a wash water inlet 520 and a sediment outlet or an outlet 530. The water treatment tank 510 is fluidly connected with the liquid sump 18 and the coagulant dosing system 200.

Wash water enters the water treatment tank 510 and a dose of coagulant is added by the coagulant dosing system 200. A time, T1, passes to allow the coagulated solids to settle to the bottom of the water treatment tank 510. The pump 550 is activated and the coagulated solids are removed from the water treatment tank 510 through the outlet 530. A time T2 passes such that the coagulated solids have been removed and only clarified water remains in the water treatment tank 510. At this time, the recirculation valve 528 is activated and the clarified water is returned to the treatment chamber 16 (FIG. 1) for re-use. Alternatively, and additionally, the clarified water can be stored in tank 510 for use in a subsequent cycle of operation. The outlet 530 may include a sensor that detects the clarity of the water and is coupled to the controller such that the outlet 530 is open to valve 528 while clarified water is moved out and open to a drain while the coagulated solids pass through. Alternatively the outlet 530 may be opened to a drain by the controller 555 according to a preset timed program for draining, rinsing, or washing the water treatment tank 510. The expected water level is designated A and the expected depth of the coagulated solids is designated B.

The water treatment system 600 is another example of a water treatment system 500 and includes like parts where the part numbers have increased by 100. In this case, besides the waste outlet 630, a clarified water outlet or a water outlet 640 for clarified water is also present and is separate from the waste outlet 630. The water outlet 640 is located at a height C in the water treatment tank 610 such that that the final expected height B of the coagulated solids is smaller than the outlet height C. Both B and C are less than the expected height of the water level A. Additionally, the water treatment system 600 includes wash water inlet 620, pump 650 and controller 655.

Wash water enters the water treatment tank 610 from the liquid sump 18 and a dose of coagulant is added by the coagulant dosing system 200. A time T1 passes to allow the coagulated solids to settle to the bottom of the water treatment tank 610. The pump 650 is activated and recirculation valve 628 is opened such that the clarified water exits the water treatment tank 610 through the water outlet 640 and is returned to the treatment chamber 16 (FIG. 1). The coagulated solids are removed from the water treatment tank 610 through the waste outlet 630. Alternatively, after a time T1 the coagulated solids are drained by opening the waste outlet 630 and the remaining clarified water is subsequently pumped out of the water treatment tank 610. The clarified water can be stored in the water treatment tank 610 until needed for reuse in the current cycle of operation. Alternatively, and additionally, the clarified water can be stored for use in a subsequent cycle of operation.

The water treatment system 700 is another example of water treatment system 600 and includes like parts where the part numbers have increased by 100 and where a reservoir 760 has been added. Additionally, the water treatment system 700 includes wash water inlet 720, pump 750 and controller 755.

Wash water enters the water treatment tank 710 and a dose of coagulant is added by the coagulant dosing system 200. A time T1 passes to allow the coagulated solids to settle to the bottom of the water treatment tank 710. The clarified water moves from the water treatment tank 710 to a reservoir 760 through the water outlet 740 by action of gravity. After a further settling time T2 has passed to allow any remaining solids to settle in the reservoir 760, the pump 750 and valve 728 are activated and the clarified water exits the reservoir 760 and is returned to the treatment chamber 16 (FIG. 1). The clarified water can be stored in the reservoir 760 until needed for reuse in the current cycle of operation. Alternatively, and additionally, the clarified water can be stored for use in a subsequent cycle of operation.

Coagulated solids are removed from the water treatment tank 710 by opening the waste outlet 730 to drain. The water outlet 740 is located at a height C in the water treatment tank 710 such that that the final expected depth B of the coagulated solids is smaller than the height C. Both A and B are less than the expected height of the water level C.

The water treatment system 800 is another example of water treatment system 600 and includes like parts where the part numbers have increased by 200 and where a partition 870 with a passage 872 has been added. The partition 870 is a rigid impermeable wall that extends the full length and width of the water treatment tank 810 and extends a partial height of the water treatment tank 810. The partition 870 separates the tank interior 811 into a first side 874 and a second side 876. The passage 872 is a valve that can open or close a fluid connection between the first side 874 and the second side 876 of the tank. The passage 872 is positioned at a height C in the partition 870 such that the final expected depth B of the coagulated solids will be smaller than the height C, and both A and B are less than the expected height of the water level C. Additionally, the water treatment system 700 includes wash water inlet 820, pump 850 and controller 855.

Wash water enters the water treatment tank 810 on the first side 874 of the tank through the wash water inlet 820 and a dose of coagulant is added by the coagulant dosing system 200. After a time T1 passes, the wash water and coagulated solids stratify. After a time T2 passes, the passage 872 is opened to allow the clarified water to pass from the first side 874 to the second side 876 of the water treatment tank 810 by the action of gravity. The water outlet 840 and the pump 850 are activated to move the clarified water from the second side 876 of the water treatment tank 810 through and the valve 828 is opened so the clarified water can be returned to the treatment chamber 16 (FIG. 1). The coagulated solids can be drained, rinsed, or washed through the waste outlet 830. The clarified water can be stored in either the first side 874 or the second side 876 of the water treatment tank 810 until moved for reuse in the current cycle of operation. Alternatively, and additionally, the clarified water can be stored in either the first side 874 or the second side 876 or both for use in a subsequent cycle of operation.

The water treatment system 900 is similar to water treatment system 700 and includes like parts where the part numbers have increased by 200 and where a shaft 980, a float 982, a float attachment 984, a hose or a line 986, and a sensor 988 have been added. The shaft 980 extends the height of the water treatment tank 910 and is rigidly anchored to the top and bottom of the water treatment tank 910. The float 982 is moveably attached to the shaft 980 by the float attachment 984. The line 986 is fixed to the float 982. The opening of the line 986 constitutes the water outlet 940. Further, the line 986 is fluidly connected to the reservoir 960. The sensor 988 is configured such that the clarified water passes within the sensing range of the sensor 988 before it enters the reservoir 960. Additionally, the water treatment system 900 includes wash water inlet 920, pump 950 and controller 955.

Wash water enters the water treatment tank 910 and a dose of coagulant is added by the coagulant dosing system 200. A time T1 passes to allow the coagulated solids to settle to the bottom of the water treatment tank 910. The pump 950 is activated to move the clarified water from the water treatment tank 910 through the water outlet 940 and the line 986 to a reservoir 960. The sensor 988 detects the transition of clarified water to impure water and can send a shut-off signal to the controller 955 such that the controller 955 stops the pump 950 to prevent solids or other impurities from entering the reservoir 960. After a further settling time T2 has passed to allow any remaining solids to settle in the reservoir 960, the valve 928 is activated and the clarified water exits the reservoir 960 and is returned to the treatment chamber 16 (FIG. 1). Coagulated solids are removed from the water treatment tank 910 by opening the waste outlet 930. The clarified water can be stored in the reservoir for reuse in the current cycle of operation. Alternatively, and additionally, the clarified water can be stored the reservoir 960 for use in a subsequent cycle of operation.

The water treatment system 1000 is similar to water treatment system 600 and includes like parts where the part numbers have increased by 400 and where an impermeable separation layer 1090, a motor 1092, and a rachet system 1094 have been added. The motor 1092 is located outside the water treatment tank 1010. The impermeable separation layer 1090 is attached to the rachet system 1094 and can be moved by the motor 1092 between a first position (e.g., vertical) and a second position (e.g., horizontal). The water outlet 1040 is located at a height C that is larger than the expected height B of the settled, coagulated solids. Additionally, the water treatment system 1000 includes wash water inlet 1020, pump 1050 and controller 1055.

Wash water enters the water treatment tank 1010 and a dose of coagulant is added by the coagulant dosing system 200. A time T1 passes to allow the coagulated solids to settle to the bottom of the water treatment tank 1010. During this time, the impermeable separation layer 1090 is in a first position (e.g. vertical position). After a time T1 has passed, the motor 1092 activates the rachet system 1094 to lower the separation layer 1090 to a second position (e.g., horizontal) such that the separation barrier sits over the settled layer of coagulated solids at an expected height B. Once the impermeable separation layer 1090 is in place, the pump 1050 is activated to move clarified water out of the water treatment tank 1010 through the water outlet 1040. The valve 1028 is activated and the clarified water is returned to the treatment chamber 16 (FIG. 1). Coagulated solids are removed from the water treatment tank 1010 by opening the waste outlet 1030. The clarified water can be stored in the water treatment tank 1010 until moved for reuse in the current cycle of operation. Alternatively, and additionally, the clarified water can be stored in the water treatment tank 1010 to be used in a subsequent cycle of operation.

The aspects described herein can be used to provide an appliance with a water treatment system capable of treating, separating, and recycling wash water. Once separated, the flocculant, sludge, and solids are drained away from the tank. It is contemplated that the solids can be drained to a household drain. Additionally, and alternatively, the solids can be drained to a separate area for removal by the consumer.

It will also be understood that various changes and/or modifications can be made without departing from the spirit of the present disclosure. By way of non-limiting example, although the present disclosure is described for use with a laundry treatment appliance, it will be recognized that the coagulant dosing system can be employed with various constructions, including dishwashers and other appliances.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A household appliance configured to perform a cycle of operation, using water, on an article, the household appliance comprising:
   a treatment chamber configured to receive the article for treatment according to the cycle of operation;
   a treating chemistry dispenser coupled to the treatment chamber; and
   a water treatment system comprising:
   a sediment tank fluidly coupled to the treatment chamber and having a sediment outlet and a clarified water outlet, which is located above the sediment outlet and fluidly coupled to the treatment chamber;
   an impermeable separation layer extending substantially across the sediment tank and moveable within the sediment tank to separate any sediment from any clarified water;
   a coagulant dosing system fluidly coupled to the sediment tank; and
   a fresh water supply fluidly coupled to at least one of the treatment chamber or the sediment tank;
   wherein fresh water supplied by the fresh water supply is used during the performance of the cycle of operation and then directed as used water to the sediment tank, where coagulant from the coagulant dosing system is supplied to the used water to increase the sediment in the sediment tank, which settles in the tank forming a layer of sediment, which can be removed via the sediment outlet, and a layer of clarified water, above the sediment, which can be removed by the clarified water outlet and reused.

2. The household appliance of claim 1 wherein the sediment tank has an expected water level and the coagulant dosing system is fluidly coupled to the sediment tank at a location below the expected water level.

3. The household appliance of claim 2 wherein the clarified water outlet is located below the expected water level.

4. The household appliance of claim 3 wherein the sediment outlet is located at or in a bottom of the sediment tank.

5. The household appliance of claim 4 wherein the at least one of the fresh water supply or treatment chamber is fluidly coupled to the sediment tank at a location above the expected water level.

6. The household appliance of claim 5 wherein the treatment chamber has a sump and the sump is fluidly coupled to the sediment tank.

7. The household appliance of claim 6 wherein the fresh water supply is fluidly coupled to the treatment chamber.

8. The household appliance of claim 7 wherein the fresh water supply is fluidly coupled to the treatment chamber via the treating chemistry dispenser.

9. The household appliance of claim 5 wherein the at least one of the fresh water supply or treatment chamber is fluidly coupled to the sediment tank at or in a top of the sediment tank.

10. The household appliance of claim 1 further comprising a pump fluidly coupling the clarified water outlet to the treatment chamber.

11. The household appliance of claim 10 wherein the clarified water outlet is fluidly coupled to the treatment chamber via the treating chemistry dispenser.

12. The household appliance of claim 10 further comprising a reservoir fluidly coupled to the clarified water outlet.

13. The household appliance of claim 12 wherein the reservoir is located fluidly upstream of the pump.

14. The household appliance of claim 1 wherein the impermeable separation layer includes a vertical partition extending from a bottom of the sediment tank to a partial height of the sediment tank, and separating the sediment tank into a first side and a second side, with the clarified water outlet located on the second side.

15. The household appliance of claim 14 wherein the clarified water outlet is on the second side at or above a bottom of the sediment tank and the sediment outlet is in the first side and in the bottom.

16. The household appliance of claim 1 further comprising a float carrying a conduit defining the clarified water outlet.

17. The household appliance of claim 1 wherein the impermeable separation layer is movable between a horizontal and a vertical position within the sediment tank.

18. The household appliance of claim 17 wherein the impermeable separation layer is movable in a vertical direction within the sediment tank.

19. The household appliance of claim 18 wherein the impermeable separation layer is moveable such that the impermeable separation layer sits over a settled layer of coagulated solids at a vertical position beneath an expected water level.

20. The household appliance of claim 19 wherein the impermeable separation layer is moveable such that the impermeable separation layer sits over a settled layer of coagulated solids at a vertical position beneath the clarified water outlet.

* * * * *